(12) United States Patent
Campbell et al.

(10) Patent No.: US 11,604,206 B2
(45) Date of Patent: Mar. 14, 2023

(54) SUPPORT GARMENT TESTING SYSTEM

(71) Applicant: NIKE, Inc., Beaverton, OR (US)

(72) Inventors: Lisa Campbell, Beaverton, OR (US); Gregory Paul Dufour, Beaverton, OR (US); Bridget Munro, Beaverton, OR (US); Ian Wright, Beaverton, OR (US); Kim B. Blair, Arlington, MA (US); Daniel A. Kingsley, Phoenix, AZ (US); Luri Robert Middleton, Philadelphia, PA (US); John David Pye, Scottsdale, AZ (US); Elizabeth A. Rapp van Roden, Lancaster, PA (US)

(73) Assignee: NIKE, Inc., Beaverton, OR (US)

( * ) Notice: Subject to any disclaimer, the term of this patent is extended or adjusted under 35 U.S.C. 154(b) by 426 days.

(21) Appl. No.: 16/813,906

(22) Filed: Mar. 10, 2020

(65) Prior Publication Data
US 2020/0309809 A1    Oct. 1, 2020

Related U.S. Application Data

(60) Provisional application No. 62/823,370, filed on Mar. 25, 2019.

(51) Int. Cl.
*G01P 13/00* (2006.01)
*A41C 3/00* (2006.01)
(Continued)

(52) U.S. Cl.
CPC ............... *G01P 13/00* (2013.01); *A41C 3/00* (2013.01); *G06F 3/0346* (2013.01); *G09B 23/32* (2013.01)

(58) Field of Classification Search
USPC ........................................................ 73/865.3
See application file for complete search history.

(56) References Cited

U.S. PATENT DOCUMENTS 5,566,867 A    10/1996 Goray
5,716,302 A    2/1998 Andersson
(Continued)

FOREIGN PATENT DOCUMENTS

CN    201888286 U    7/2011
CN    105815857 A    8/2016
(Continued)

OTHER PUBLICATIONS

Matchar, Emily, "This Morphing Mannequin Could Transform the Fashion Industry", Smithsonian Magazine, Available online at: <https://www.smithsonianmag.com/innovation/this-morphing-mannequin-could-transform-fashion-industry-180958240/>, Feb. 29, 2016, pp. 1-2.
(Continued)

*Primary Examiner* — Paul D Lee
(74) *Attorney, Agent, or Firm* — Shook Hardy & Bacon, L.L.P.

(57) ABSTRACT

Aspects herein are directed to a support garment testing system comprising a torso form having a motion tracking sensor associated with one or more breast structures of the torso form. A support garment is secured to the torso form, and the torso form is mounted on a motion platform that, when actuated, causes displacement of the breast structures. The amount of displacement is measured by the sensor, and the data is used to assign a level of support provided by the support garment.

20 Claims, 15 Drawing Sheets

(51) Int. Cl.
*G06F 3/0346* (2013.01)
*G09B 23/32* (2006.01)

(56) References Cited

U.S. PATENT DOCUMENTS

| | | | |
|---|---|---|---|
| 5,913,708 A | 6/1999 | Gross | |
| 6,435,386 B2 | 8/2002 | Scott | |
| 6,769,286 B2 | 8/2004 | Biermann et al. | |
| 7,162,441 B2 | 1/2007 | Nabarro | |
| 7,930,920 B2 | 4/2011 | Le Carpentier | |
| 8,997,579 B2 | 4/2015 | Carbo et al. | |
| 9,243,966 B2 | 1/2016 | Beillas et al. | |
| 9,498,011 B2 | 11/2016 | Chan et al. | |
| 9,514,487 B2 | 12/2016 | Wilkinson et al. | |
| 9,587,916 B2 | 3/2017 | Burtan | |
| 2004/0222249 A1 | 11/2004 | Bentham et al. | |
| 2006/0078870 A1 | 4/2006 | Yu et al. | |
| 2008/0027744 A1* | 1/2008 | Nethero | G06Q 30/02 705/500 |
| 2012/0006864 A1 | 1/2012 | McCarthy | |
| 2012/0321040 A1* | 12/2012 | Maltbie | G09B 23/286 378/62 |
| 2013/0238285 A1 | 9/2013 | Volchek | |
| 2016/0165989 A1 | 6/2016 | Glasgow et al. | |
| 2016/0284018 A1 | 9/2016 | Adeyoola et al. | |

FOREIGN PATENT DOCUMENTS

| | | |
|---|---|---|
| CN | 106393125 B | 10/2018 |
| EP | 2568835 B1 | 8/2015 |
| RU | 2052971 C1 | 1/1996 |
| TW | M503773 U | 7/2015 |
| TW | 201906577 A | 2/2019 |
| WO | 01/28390 A2 | 4/2001 |
| WO | 2011/141646 A1 | 11/2011 |
| WO | 2012/082987 A1 | 6/2012 |
| WO | 2019/026730 A1 | 2/2019 |

OTHER PUBLICATIONS

International Preliminary Report on Patentability received for PCT Patent Application No. PCT/US2020/022423, dated Oct. 7, 2021, 9 pages.

International Search Report and Written Opinion received for PCT Patent Application No. PCT/US2020/022423, dated Jul. 2, 2020, 6 pages.

* cited by examiner

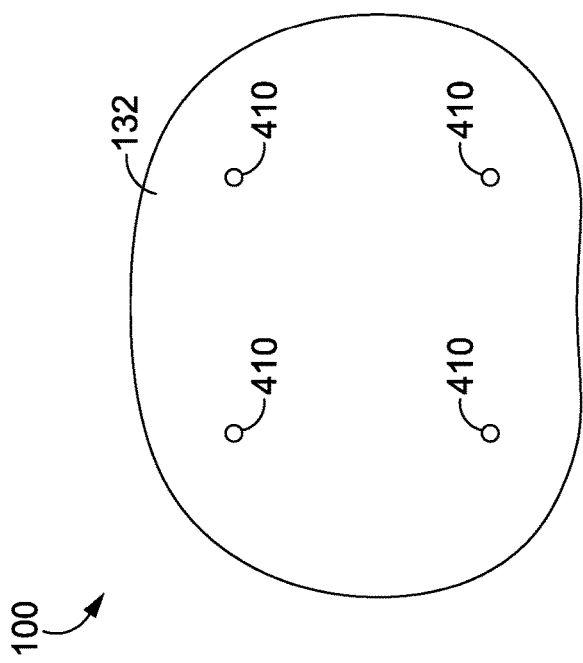
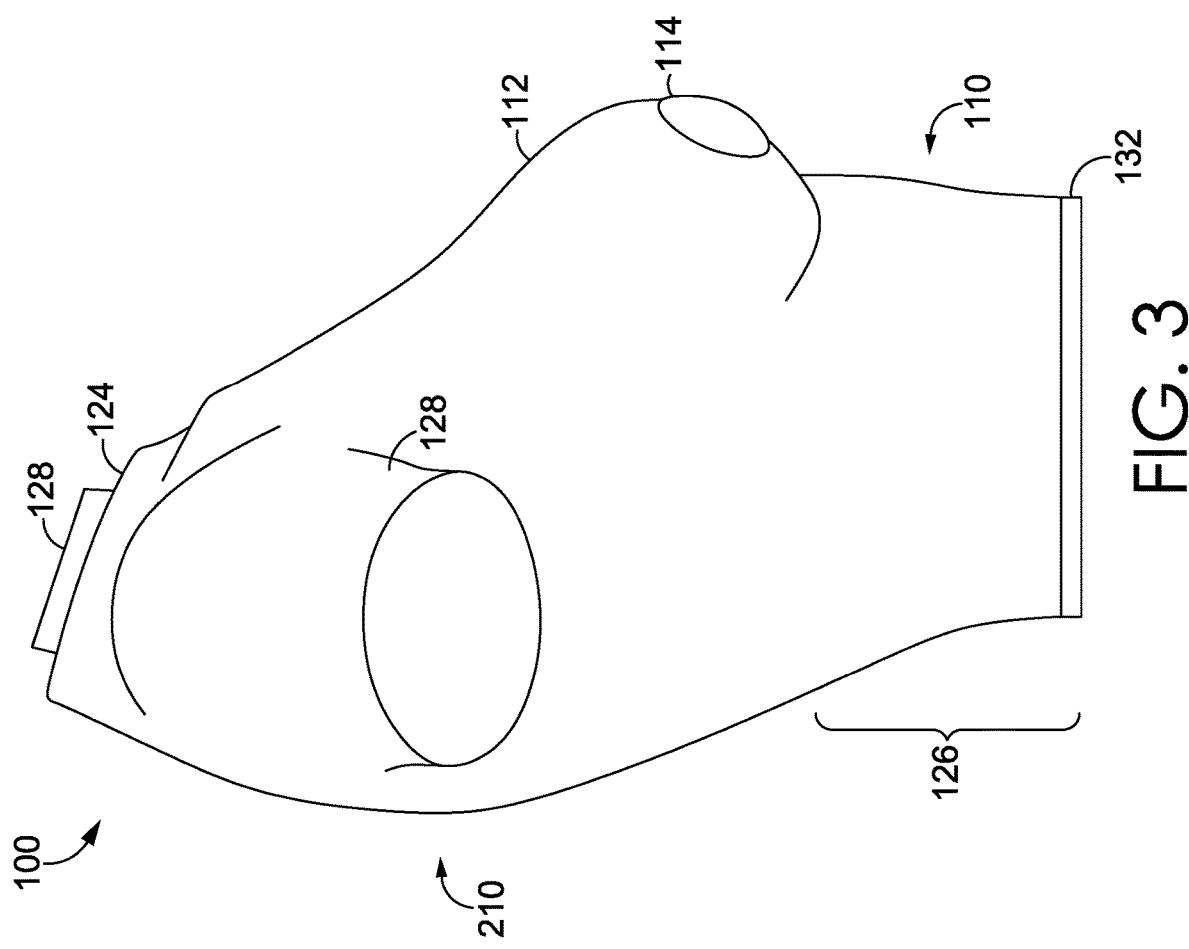

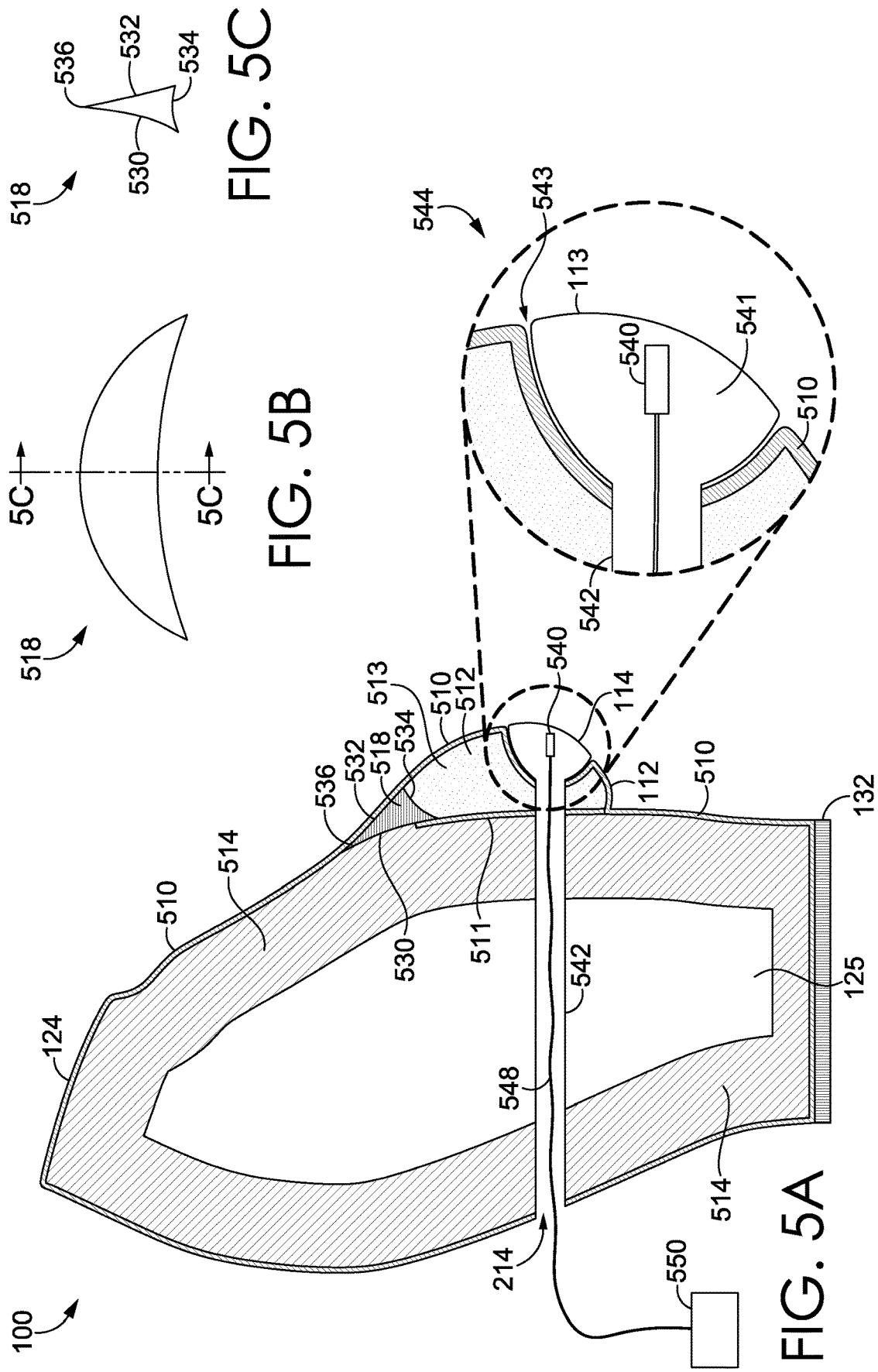

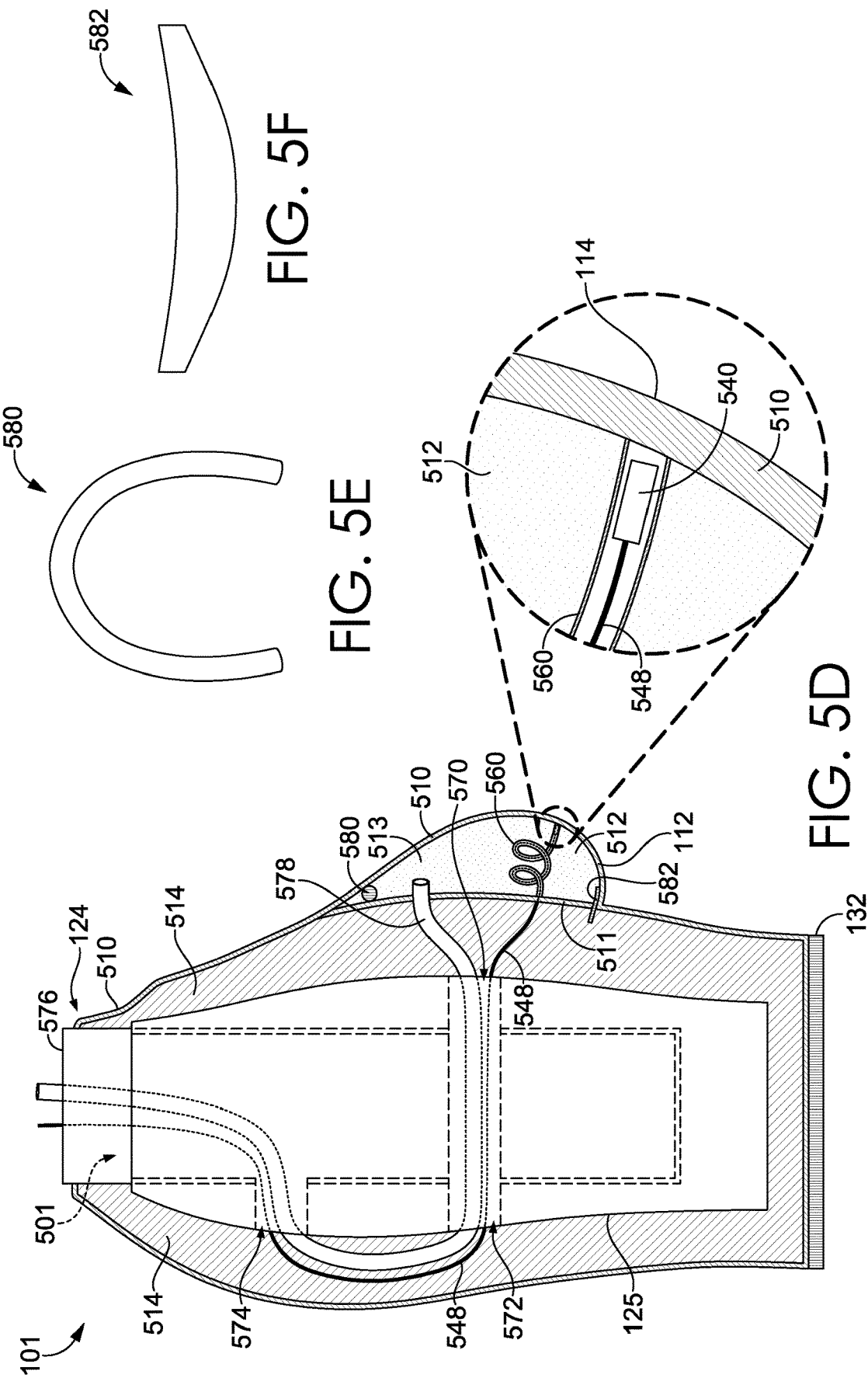

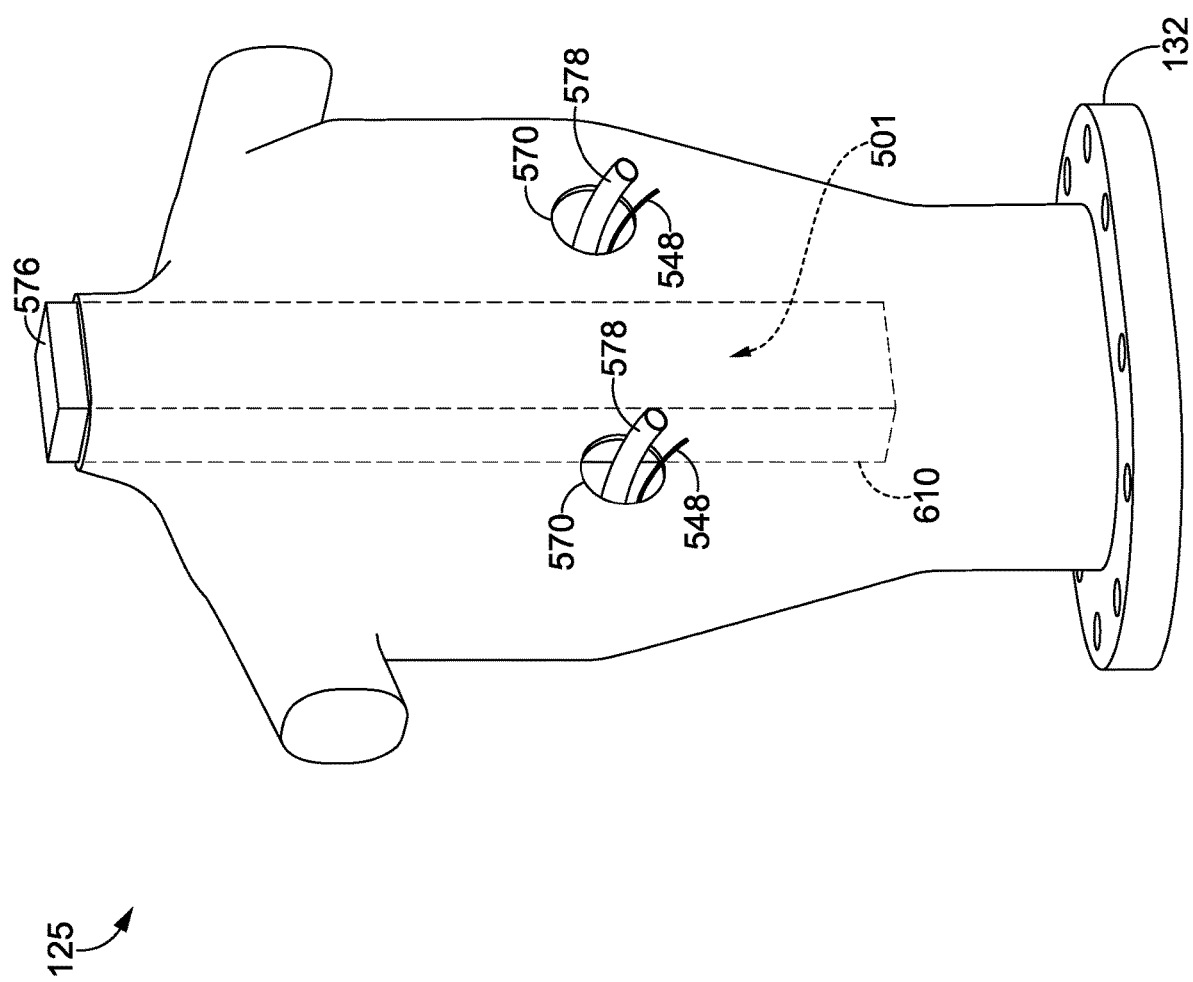

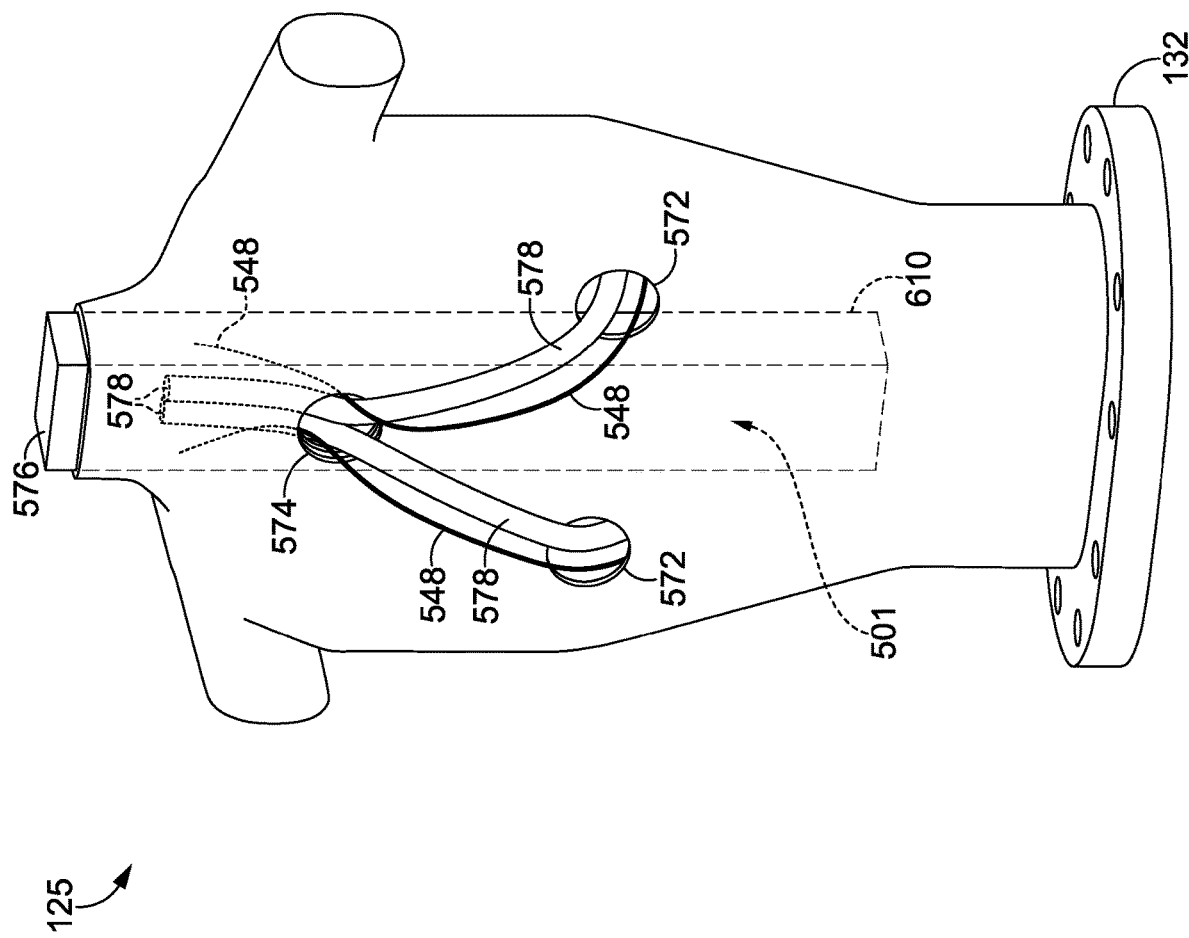

SUPPORT GARMENT TESTING SYSTEM

CROSS-REFERENCE TO RELATED APPLICATIONS

This application having attorney docket number 339472/190065US02 and entitled "Support Garment Testing System," claims the benefit of priority to U.S. Prov. App. No. 62/823,370, entitled "Support Garment Testing System," and filed Mar. 25, 2019. The entirety of the aforementioned application is incorporated by reference herein.

TECHNICAL FIELD

Aspects herein relate to a testing system for measuring the level of support provided by a support garment, such as a bra.

BACKGROUND

Historically it has been difficult to assign a level of support provided by a support garment to a wearer's breasts in a reproducible and measurable way. Instead, it has often been a subjective determination based on a fit model's perception of the level of support.

BRIEF DESCRIPTION OF THE DRAWINGS

Examples of aspects herein are described in detail below with reference to the attached drawing figures, wherein:

FIG. 3 illustrates a side view of the torso form of FIG. 1 in accordance with aspects herein;

FIG. 4 illustrates a bottom view of the torso form of FIG. 1 in accordance with aspects herein;

FIG. 5A illustrates a cross-sectional view of a first example torso form in accordance with aspects herein;

FIG. 5B illustrates a front view of an optional transition insert for the first example torso form of FIG. 5A in accordance with aspects herein;

FIG. 5C illustrates a cross-sectional view taken along cut line 5C-5C of FIG. 5B in accordance with aspects herein;

FIG. 5D illustrates a cross-sectional view of a second example torso form in accordance with aspects herein;

FIG. 5E illustrates a first insert for use in the second example torso form of FIG. 5D in accordance with aspects herein;

FIG. 5F illustrates a second insert for use in the second example torso form of FIG. 5D in accordance with aspects herein;

FIG. 6A illustrates a front perspective view of a core for use in the example torso form of FIG. 5D in accordance with aspects herein;

FIG. 6B illustrates a back perspective view of the core of FIG. 6A in accordance with aspects herein;

DETAILED DESCRIPTION

Figure 1:
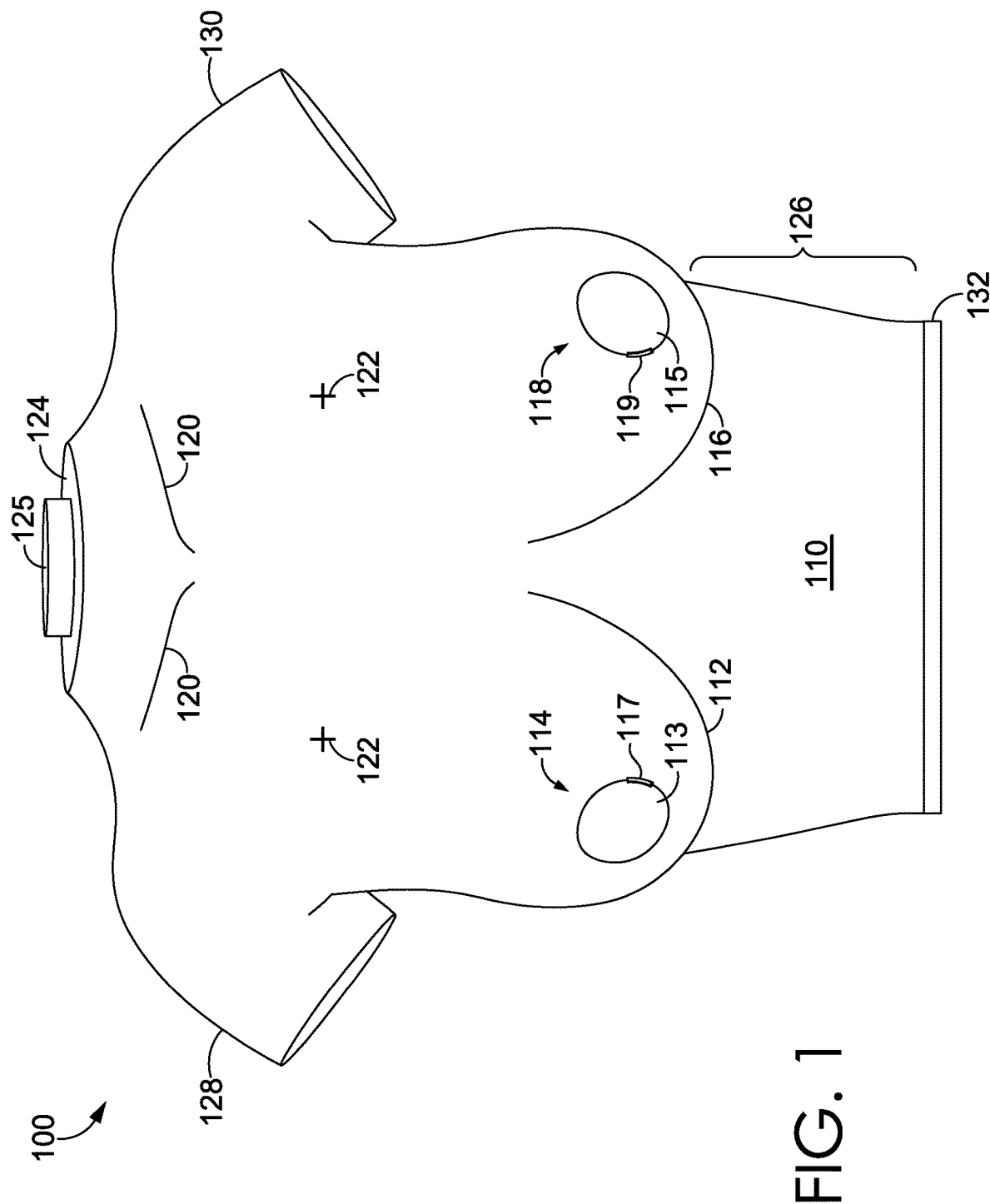
FIG. 1 illustrates a front view of an example torso form for use in a support garment testing system in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Historically it has been difficult to assign a level of support provided by a support garment to a wearer's breasts in a reproducible and measurable way. Instead, it has often been a subjective determination based on a fit model's perception of the level of support. Aspects herein are directed to a support garment testing system that may be used to assess the level of support provided by a support garment to a female wearer's breasts. The testing system is able to assess the level of support provided by multiple different support garments in a reproducible and measurable way with the result that a consumer can confidently select a support garment with the appropriate level of support for her needs.

In one aspect, the support garment testing system utilizes at least a torso form having a first breast structure and a second breast structure, a sensor such as a motion tracking sensor associated with the torso form, a motion platform that can move through up to six degrees of motion, and a computing system usable for analyzing the data captured by the sensor. In example aspects, the sensor is integrated into the torso form although it is contemplated herein that the sensor may be affixed or secured to an outer surface of the torso form. More specifically, the sensor is positioned within one or more of the first breast structure and the second breast structure including placement within the nipple area of the respective breast structure. By positioning the sensor within one or more of the first breast structure and the second breast structure, wear and tear on the sensor is reduced and inadvertent displacement or movement of the sensor is also reduced. In one aspect, a single sensor may be used such that the single sensor is positioned within one of the first breast structure or the second breast structure. In another aspect, two sensors may be used for redundancy with one sensor being positioned within the first breast structure and the second sensor being positioned within the second breast structure. When two sensors are used, only one sensor may be active at a time to increase the longevity of the torso form. In line with this, it is contemplated herein that the torso form may be configured so that the sensor may be replaced when needed.

A support garment, such as a bra, is secured on to the torso form, and the torso form is removably mounted to the motion platform. The motion platform is then actuated to move in one or more directions. The amount of displacement (both linear and rotational), velocity of displacement, and/or frequency of displacement of the first breast structure and/or the second breast structure is captured by way of the sensor while the motion platform is moving. Additional data related to breast displacement and/or movement may also be captured by positioning one or more external markers on the torso form and capturing movement of the markers using a motion capture system. Moreover, additional sensors, such as load sensors and/or stretch sensors may also be utilized.

The displacement data provided by the sensor, and optionally the data captured through the motion capture system, is used to an assign a level of support to the support garment. In one example, the level of support is determined by comparing the displacement data captured while the support garment is secured to the torso form with displacement date captured when a support garment is not secured to the torso form (i.e., when the torso form is in a "braless" state) where similar testing conditions are used in both (e.g., same movements in specified directions, same degrees of the movement in the specified directions, same frequencies of the movements in the specified directions, same duration of testing cycle, and the like). By utilizing the system described herein, a measurable and reproducible way of assigning levels of support to support garments is achieved.

It is contemplated herein that the torso form is configured such that it is possible to change the size of the first and second breast structures by the addition or removal of materials to or from the first and second breast structures. This feature expands the use of the torso form to determine the level of support provided by a support garment configured for wear by wearers with small breasts, medium breasts, and large breasts.

With respect to the torso form, materials used to create the torso form are selected to replicate as much as possible the breast displacement that naturally occurs when a human wearer engages in, for instance, athletic activities. As explained more fully below, it was determined that a multi-layered torso form, as opposed to just having breast structures positioned on a rigid frame, helps to facilitate the displacement characteristics that occur naturally with the human breast. In other words, materials used to create the torso form may be selected to mimic, as much as possible, physical properties associated with human breasts, human skin, human muscle, and/or human skeletal structures. The materials include skin surrogate materials, breast surrogate materials, muscle surrogate materials, and/or skeletal surrogate materials. In example aspects, the skeletal surrogate materials may comprise a rigid core such as a rigid foam core to provide structural stability to the torso form and to enable the torso form to be mounted to, for instance, the motion platform.

The sensor, in example aspects, may comprise a motion tracking sensor that is able to capture degrees of displacement, both linear and rotational, frequency of movement, and/or velocity of movement through up to six degrees of movement. By associating the sensor with the breast structure and specifically with the nipple area of the breast structure, the sensor is able to accurately capture the displacement experienced by the breast structure during movement. Moreover, since the nipple area typically represents the anterior-most aspect of a breast, positioning the sensor in this location enables the sensor to capture the maximum amount of displacement experienced by the breast structures.

Positional terms as used herein such as "front," "back," "top," "bottom," "superior," "inferior," and the like are with respect to a torso form in an upright position (e.g., a neck area of the torso form positioned above a waist area of the torso form) and with the breast structures positioned on the front of the torso form. These same terms when used to describe, for example, a support garment contemplate that a front portion of a support garment is configured to cover the front of the torso form, and a back portion of the support garment is configured to cover the back of the torso form.

Terms such as "releasably secured," means that the torso portion can be mounted to a motion platform when testing is desired and can be removed from the motion platform when needed. Releasable attachment technologies may comprise screws, adhesives, clamps, and the like. When referring to "breast structures" and a "nipple area," reference is made to typical female physiology where breasts are located generally symmetrically on the upper front torso of a wearer and the nipple area of the breast is typically located at an apex of the breast. The term "about" as used herein means within ±5% of a designated value.

As described herein, the sensor may be "associated" with the torso form or with the breast structures and/or nipple area of the breast structures. The term "associated" means that the sensor is integrated into the torso form as the torso form is casted, the sensor is positioned within an interior of the torso form by way of a conduit tube positioned within the torso form (the placement of the sensor may occur in a post-casting step), the sensor is secured or affixed to an outer-surface of the torso form, and the like. Any and all aspects, and any variation thereof, are contemplated as being within aspects herein.

Material properties of the different components of the torso form are provided herein and include storage modulus, hardness, tensile modulus, and elongation at break. Storage modulus is used with viscoelastic materials and measures both the stored energy, represented by the elastic portion of the material, and the energy dissipated as heat, represented by the viscous portion. Storage modulus as used herein is measured by dynamic material analysis (DMA) at 1 Hz at room temperature. The hardness of materials described herein may be determined by measuring the resistance of a sample to material deformation due to a constant compression load from an object. As used herein, hardness is measured using ASTM D-2240. Tensile modulus is a measure of the resistance to elastic deformation that a material has and is commonly measured by dividing the amount of stress applied to a material by the strain the material undergoes. A testing standard used to measure tensile modulus is ASTM D-412. Elongation at break relates to the ability of a material to resist changes of shape without cracking or breaking and is the ratio between final length and initial length after breakage of a material at a controlled temperature. A testing standard used to measure elongation at break is ASTM D-412.

Figure 2:
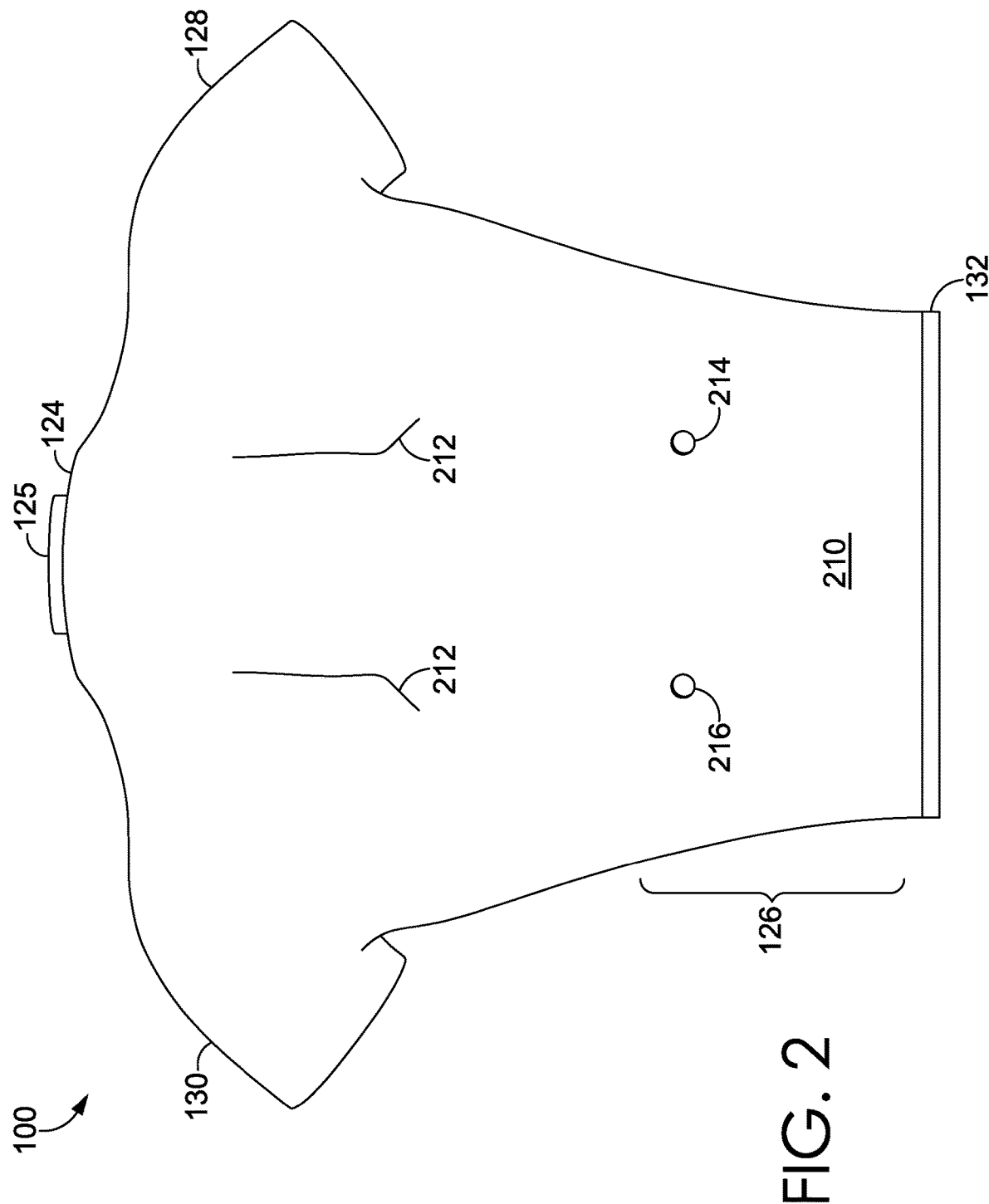
FIG. 2 illustrates a back view of the torso form of FIG. 1 in accordance with aspects herein.

FIGS. 1 and 2 illustrate front and back views of a first example torso form 100. The torso form 100 includes a front torso area 110 having a first breast structure 112 with a first nipple area 114 and a second breast structure 116 with a second nipple area 118. The front torso area 110 may further include anatomical features such as clavicles 120. With respect to FIG. 2, the torso form 100 further includes a back torso area 210 that may include anatomical features such as scapula 212. The anatomical features such as the clavicles 120, the scapula 212, and the first and second breast structures 112 and 116 with the first and second nipple areas 114 and 118 may provide landmarks for properly positioning a support garment on the torso form 100. To aid in this, and in one example, the first and second nipple areas 114 and 118 may be formed to protrude from the first and second breast structures 112 and 116 and/or to have a different density (e.g., more firm) to provide a visual and/or a tactile landmark. In another example, the first and second nipple areas 114 and 118 may optionally each include a sensor receptacle 113 and 115 respectively. Alternatively, the torso form 100 may include a single sensor receptacle such as the sensor receptacle 113 or the sensor receptacle 115. The sensor receptacles 113 and 115 may be formed of a material having a different density and/or texture to also provide a visual and/or a tactile landmark. Any and all aspects, and any variation thereof, are contemplated as being within aspects herein.

The optional sensor receptacles 113 and 115 may, in example aspects, be openable by way of, for instance, opening mechanisms 117 and 119 (e.g., a hinged opening) respectively to allow access to a space positioned behind the first and second nipple areas 114 and 118 as further explained with respect to FIG. 5A. The sensor described herein may be positioned within the space and thereby may be accessed by way of the opening mechanisms 117 and 119 of the sensor receptacles 113 and 115. In another example, the first and second nipple areas 114 and 118 may not include the sensor receptacles 113 and 115. In this aspect, the sensor described herein may be positioned within the breast surrogate material of the first and second breast structures 112 and 116 and secured to, for example, the first and second nipple areas 114 and 118 as shown in FIG. 5D.

In example aspects, the torso form 100 may further include optional registration marks, such as registration marks 122 located on one or more of the front torso area 110 and/or the back torso area 210, to further guide placement of the support garment on the torso form 100. The registration marks 122 may include visual indicia that are applied to a skin surface of the torso form 100 during or after the torso form 100 is casted, or the registration marks 122 may be integrated into the skin surface of the torso form 100 when the torso form 100 is casted or in a post-casting step. The location of the registration marks 122 is illustrative only and the registration marks 122 may be located in other positions in accordance with aspects herein.

The torso form 100 further includes a neck portion 124 through which, in example aspects, part of a core 125 may extend, a waist portion 126 extending below the first and second breast structures 112 and 116, a first arm portion 128, and a second arm portion 130. The first and second arm portions 128 and 130 may comprise just the upper part of an arm structure to keep the weight of the torso form 100 down, to make it easier to transport, and to make it easier to position a support garment on the torso form 100. In example aspects, a mounting structure 132 is secured to a bottom surface of the torso form 100 where the mounting structure 132 is useable for mounting the torso form 100 to a motion platform.

The back torso area 210 may optionally comprise one or more ports 214 and 216. The ports 214 and 216 may be useable for placing or replacing sensors in the first and second breast structures 112 and 116. As well, the ports 214 and 216 may be useable to add additional breast surrogate material to the first and second breast structures 112 and 116 to, for instance, increase the size of the first and second breast structures 112 and 116 and/or to decrease the skin layer thickness of the first and second breast structures 112 and 116. The ports 214 and 216 may also be used to remove breast surrogate material from the first and second breast structures 112 and 116 to decrease the size of the first and second breast structures 112 and 116. Any and all aspects, and any variation thereof, are contemplated as being within aspects herein.

FIGS. 3 and 4 illustrate a side view and a bottom view of the torso form 100 respectively. The side view of FIG. 3 depicts the first breast structure 112 with the first nipple area 114. It is known that larger-breasted women often need more support than smaller-breasted women. To better meet this need, the torso form 100 may be created to have the first and second breast structures 112 and 116 simulate a 36D through a 36DD cup size, although it is contemplated herein that the torso form 100 may be created to have breast structures in different sizes including smaller and larger sizes than 36D or 36DD such as, for example, 32A-DD, 34A-DD, 38A-DD, sizes larger than DD and the like. In example aspects, the first and second breast structures 112 and 116 may be adapted to assume a number of different sizes through the addition and removal of breast surrogate material to the first and second breast structures 112 and 116. It is further contemplated herein that a circumference of the torso form 100 in the area where the lower part of the first and second breast structures 112 and 116 meet the chest may be from about 33 inches to about 35 inches, or from about 33.5 inches to about 34.5 inches.

The bottom view of FIG. 4 illustrates the mounting structure 132. As mentioned, the mounting structure 132 is used to releasably secure the torso form 100 to a motion platform. Reference numeral 410 which indicates screw holes, illustrates an example way of securing the torso form 100 to a motion platform although other attachment means are contemplated. In example aspects, the mounting structure 132 may comprise a metal plate to provide structural stability when the torso form 100 is mounted on a motion platform.

FIG. 5A depicts an example cross-sectional view of the torso form 100 taken through the first breast structure 112 and illustrates one example structure of the torso form 100. As mentioned above, the materials used to create the torso form 100 are selected to simulate, as much as possible, a human female torso in order to accurately reproduce the displacement of breasts that occurs when a human wearer engages in physical activity. In example aspects, the torso form 100 comprises a skin layer 510 shown with positively sloped hatching, a breast surrogate material 512 indicated with stippling, a muscle layer 514 shown with negatively sloped hatching, and the core 125 shown with no shading. The skin layer 510 forms, at least in part, an outer surface of the torso form 100. Although shown as extending along an entire perimeter of the outer surface of the torso form 100 in FIG. 5A, it is contemplated that there may be portions of the torso form 100 from which the skin layer 510 is absent. For instance, the bottom of the torso form 100 may not comprise the skin layer 510. As well, the skin layer 510 may be absent around the neck portion 124 or may be absent from the terminal ends of the first and second arm portions 128 and 130. Any and all aspects, and any variation thereof, are contemplated as being within the scope herein.

The first and second breast structures 112 and 116 comprise the skin layer 510 and the breast surrogate material 512. For instance, the skin layer 510 may define a cavity for each of the first and second breast structures 112 and 116, such as cavity 513, in which the breast surrogate material 512 is positioned. The muscle layer 514 forms, in part, an interior of the torso form 100, and the core 125 also forms, in part, the interior of the torso form 100. Thus, as shown in FIG. 5A, the torso form 100 includes the core 125 which is at least partially surrounded or enclosed within the muscle layer 514. In turn, the muscle layer 514 is at least partially surrounded or enclosed within the skin layer 510. The skin layer 510 also at least partially surrounds or encloses the breast surrogate material 512.

Starting first with the skin layer 510, in example aspects, the skin layer 510 is formed from a silicone material, which is liquid in an uncured state. An example silicone material may include, for example, Dragon-Skin™ 10 VERY FAST produced by Smooth-On®, Inc. located in Macungie, Pa. The skin layer 510 may be tinted with pigment to achieve a desired skin tone. In example aspects, the material used to form the skin layer 510 is selected to have a storage modulus (G') from about 0.35 MPa to about 0.95 MPa, from about 0.45 MPa to about 0.85 MPa, from about 0.55 MPa to about 0.75 MPa, or about 0.65 MPa. The skin layer 510 is also selected to have a Shore A hardness from about 7 to about 13, from about 8 to about 12, from about 9 to about 11, or about 10. The skin layer 510 is additionally selected to have a tensile modulus from about 75% to about 100%, from about 85% to about 100%, from about 95% to about 100%, or about 100% of 0.152 MPa. The skin layer 510 is further selected to have an elongation at break from about 955% to about 1040%, from about 970% to about 1030%, from about 980% to about 1020%, from about 990% to about 1010%, or about 1000%.

In example aspects, the thickness of the skin layer 510 may be variable depending on the location on the torso form 100. For example, the thickness may range from about 0.8 mm to about 7 mm, from about 0.9 mm to about 6.5 mm, from about 1.0 mm to about 6.0 mm, from about 1.25 mm to about 5.75 mm, or from about 1.5 mm to about 5 mm. More specifically, areas of the torso form 100 for which the skin layer 510 may need greater elongation would generally have a thinner skin layer 510 while areas of the torso form for which the skin layer 510 may need less elongation would generally have a thicker skin layer 510. To use an example, because the first and second breast structures 112 and 116 may experience more displacement during movement compared to, for instance, the back torso area 210, the first and second arm portions 128 and 130 or the waist portion 126, the thickness of the skin layer 510 of the first and second breast structures 112 and 116 may be less than the thickness of the skin layer 510 at the back torso area 210, the first and second arm portions 128 and 130, and/or the waist portion 126. Having a thinner skin layer 510 for the first and second breast structures 112 and 116 means that the skin layer 510 can undergo a greater degree of elongation during displacement. In example aspects, the thickness of the skin layer 510 for the first and second breast structures 112 and 116 may comprise from about 0.8 to about 1.8 mm, from about 0.9 mm to about 1.7 mm, from about 1.0 mm to about 1.65 mm, from about 1.25 mm to about 1.6 mm, or about 1.5 mm, and the thickness of the skin layer 510 for the back torso area 210, the first and second arm portions 128 and 130, the waist portion 126, and remaining portions of the torso form 100 not including the first and second breast structures 112 and 116 may comprise from about 3.0 mm to about 8.0 mm, from about 3.5 mm to about 7.0 mm, from about 4.0 mm to about 6.00 mm, or about 5.0 mm.

The breast surrogate material 512 is positioned within the first and second breast structures 112 and 116. In example aspects, a skin layer 511 may be positioned interior (i.e., closer to the center of the torso form 100) to the breast surrogate material 512 so that it acts to contain the breast surrogate material 512 within the first and second breast structures 112 and 116 and effectively seals the cavity 513. In example aspects, the breast surrogate material 512 may comprise a combination of polyethylene glycol (PEG), alumina powder, and tungsten powder. In example aspects the PEG may comprise PEG-400-1 produced by Chem-World with locations in Kennesaw, Ga., Salt Lake City, Utah, and Taylor, Mich., the alumina powder may comprise ALUMP005-5 from SMS Labs with headquarters in Sturbridge, Mass., and the tungsten powder may comprise 510106 tungsten powder from Millipore Sigma with headquarters in Damstadt, Germany. The PEG, alumina powder and tungsten powder may be mixed in various combinations at example ratios of from about 2.5 liters PEG, 400 grams alumina powder, and 2800 grams tungsten powder to about 1.5 liters PEF, 200 grams alumina powder, and 2600 grams tungsten powder, or about 2 liters PEG, 300 grams alumina powder, and 2700 grams tungsten powder (approximately 6 pounds of tungsten powder) to achieve a desired specific gravity and viscosity. In example aspects, the tungsten powder is used to add a desired mass to the breast surrogate material 512, and the alumina powder is used to add a desired viscosity to the breast surrogate material 512. In example aspects the breast surrogate material has a specific gravity of from about 1.5 to about 3.5, from about 1.75 to about 3.0, from about 2.0 to about 2.75, or about 2.4. It has been found that configuring the breast surrogate material 512 as described above simulates natural breast movement/ displacement during exercise. Further, aspects herein contemplate adjusting the amount of tungsten powder and the amount of alumina powder to achieve a desired specific gravity and viscosity.

The muscle layer 514 forms, at least in part, the interior of the torso form 100 and helps to provide structural stability to the torso form 100. Materials used to form the muscle layer 514 are selected to mimic, as much as possible, characteristics of human torso muscles. For instance, materials used to form the muscle layer 514 may be selected to have a higher tensile modulus and a lower elongation at break compared to, for instance, the materials used to form the skin layer 510. The muscle layer 514 may be formed from a silicone material such as, for example, Dragon-Skin™ 30 produced by Smooth-On® Inc. Pigments may be added to the silicone material to achieve a desired coloration of the muscle layer 514. In example aspects, the material used to form the muscle layer 514 is selected to have a storage modulus (G') from about 0.12 MPa to about 0.20 MPa, from about 0.13 MPa to about 0.19 MPa, from about 0.14 MPa to about 0.18 MPa, from about 0.15 MPa to about 0.17 MPa, or about 0.16 MPa. The muscle layer 514 is further selected to have a Shore A hardness from about 27 to about 33, from about 28 to about 32, from about 29 to about 31, or about 30. The muscle layer 514 is also selected to have a tensile modulus from about 75% to about 100%, from about 85% to about 100%, from about 95% to about 100% or about 100% at 0.593 MPa. And the muscle layer 514 is selected to have an elongation at break from about 330% to about 400%, from about 340% to about 390%, from about 350% to about 380%, from about 355% to about 370%, or about 360%. Moreover, materials used to form the muscle layer 514 are selected to be compatible with the materials used to form the skin layer 510 and to promote adhesion with the materials used to form the skin layer 510 to reduce the chances of delamination.

FIG. 5A further illustrates an optional transition insert 518 that helps to provide a transition between the first breast structure 112 and the area of the torso form 100 superior to or above the first breast structure 112. A similar transition insert may also be used for the second breast structure 116. The transition insert 518 may have material properties intermediate between the breast surrogate material 512 and the skin layer 510. Providing a gradual transition between the material properties associated with the first and second breast structures 112 and 116 and the area of the torso form 100 superior to the first and second breast structures 112 and 116 may reduce the stress on the skin layer 510 in this area thereby increasing the longevity of the torso form 100.

The transition insert 518 includes a crescent-shaped foam material formed using, for instance, an open cell foam such as a polystyrene foam or a polyurethane foam. A front view of the transition insert 518 is shown in FIG. 5B, and FIG. 5C illustrates a cross-section of the transition insert 518 taken along cut line 5C-5C of FIG. 5B. The crescent shape of the transition insert 518 as shown in FIG. 5B enables the transition insert 518 to curve around the medial, upper, and lateral aspects of the first breast structure 112. As shown in FIG. 5C, the transition insert 518 has a back side 530, a front side 532, a bottom 534, and a top 536. The front side 532 of the transition insert 518 tapers as it extends from bottom 534 to the top 536 of the transition insert 518 to ensure a gradual transition between the first breast structure 112 and the area of the torso form 100 superior to the first breast structure 112.

As shown in FIG. 5A, the front side 532 of the transition insert 518 is in contact with the skin layer 510, and the back side 530 of the transition insert 518 is partially in contact with the skin layer 511 and partially in contact with the muscle layer 514. By using an open cell foam to form the transition insert 518, the materials forming the skin layer 510, the skin layer 511, and the muscle layer 514 may at least partially impregnate the transition insert 518 helping to secure the transition insert 518 and reduce delamination between the transition insert 518, the skin layer 510, the skin layer 511, and the muscle layer 514. The core 125 forms, at least in part, the interior of the torso form 100 and will be discussed below with respect to FIGS. 6A and 6B.

FIG. 5A further illustrates one example way of positioning a sensor 540 within, for instance, the first breast structure 112. In example aspects, a conduit tube 542 may be co-molded with the torso form 100 such that it extends from the first nipple area 114 of the first breast structure 112, through the breast surrogate material 512, through the skin layer 510, through the muscle layer 514, optionally through the core 125, and the skin layer 510, to the back torso area 210 of the torso form 100. In this aspect, the port 214 provides access to the conduit tube 542. A similar configuration may be used for the second breast structure 116. In example aspects, the conduit tube 542 may include a flexible tube formed from, for example, latex or silicone. Although shown as extending relatively straight, it is contemplated herein that the flexible nature of the conduit tube 542 may allow for some flexing and curving as the conduit tube 542 extends from the port 214 to the first nipple area 114. For example, the conduit tube 542 may be positioned to include one or more loops to allow a degree of mechanical stretch as the torso form 100 is manipulated.

As shown in the magnified view 544, the conduit tube 542 may terminate in the sensor receptacle 113, where the sensor receptacle 113 may comprise a bulbous form although other forms are contemplated herein. The sensor receptacle 113 may also be co-molded with the torso form 100. The sensor receptacle 113, in one example aspect, is an integral extension of the conduit tube 542. Or, in another example aspect, the sensor receptacle 113 is a separate element from the conduit tube 542 and may be secured to the conduit tube 542 using, for instance, an adhesive or other types of bonding or sealing methods. When formed as a separate element, it is contemplated herein that the sensor receptacle 113 may be formed of a more rigid material such as, for example, plastic, to allow for easier manipulation of the sensor receptacle 113. As described above, the sensor receptacle 113 may comprise the opening mechanism 117 (shown in FIG. 1) to allow access to a space 541 within the sensor receptacle 113.

In example aspects, the torso form 100 may be casted so that the skin layer 510 at the first and second nipple areas 114 and 118 extends inwardly (i.e., toward the core 125) to form a depression 543 in which the sensor receptacle 113 is positioned allowing easy access to the sensor receptacle 113. The sensor receptacle 113 may, in example aspects, protrude slightly past the outer plane of the first breast structure 112 to provide a visual and/or tactile marker that may help in positioning a support garment on the torso form 100.

The sensor 540 is positioned within the sensor receptacle 113 so that it is effectively positioned at the first nipple area 114 of the first breast structure 112. As described above, placement of the sensor 540 within the first nipple area 114 allows for measurement of the maximum displacement experienced by the first breast structure 112 during movement. The sensor 540 includes a sensor lead 548 that extends from the sensor 540 through the conduit tube 542 to exit the back torso area 210 by way of the port 214 where it is connected to, for instance, a power supply and/or a processor (indicated generically by the term "processor" and indicated by the reference numeral 550). In example aspects, the sensor 540 may be a motion tracking sensor that tracks movement through six degrees of motion. One example sensor that may be used herein is the Micro Sensor 1.8™ produced by Polhemus Innovation in Motion™ located in Colchester, Vt. In example aspects, the sensor 540 is an electromagnetic sensor that measures the direction and orientation of magnetic fields generated by electrical currents that run through three wire coils that are arranged perpendicular to each other. In this instance, a transmitter (shown in FIG. 11) is secured to the torso form 100 where the transmitter emits the electromagnetic fields. Other motion tracking systems are contemplated herein such as mechanical tracking systems.

Use of the conduit tube 542 and the sensor receptacle 113 may allow for the sensor 540 to be replaced when needed. For instance, the sensor 540 is accessed using the opening mechanism 117 of the sensor receptacle 113. The sensor lead 548 may be cut and the sensor 540 may be removed from the front of the torso form 100 by way of the sensor receptacle 113. The sensor lead 548 may be removed from the torso form 100 by way of the port 214. A new sensor may be inserted into the torso form 100 using the port 214 and the conduit tube 542. The positioning of the new sensor within the first nipple area 114 may be adjusted using the sensor receptacle 113. The port 214, the conduit tube 542, and the sensor receptacle 113 are just one example way of positioning the sensor 540 within the first breast structure 112. Other example ways may include not using a conduit tube and, instead, embedding the sensor 540 directly within the skin layer 510 that forms the first nipple area 114 during the casting of the torso form 100. In this example, the sensor lead 548 may run directly through the breast surrogate material 512, through the muscle layer 514, optionally through the core 125 to ultimately exit the back torso area 210 by way of the port 214. Moreover, the location of the port 214 on the back torso area 210 of the torso form 100 is illustrative only and the port 214 may be located at other areas on the torso form 100 (e.g., near a lower back area, a side area, and the like). Any and all aspects, and any variation thereof, are contemplated as being within aspects herein.

FIG. 5D depicts an example cross-sectional view of an alternative torso form 101 taken through the first breast structure 112. The materials used to form the torso form 101 shown in FIG. 5D are the same as those described with respect to FIG. 5A, and, as such, are indicated with the same reference numerals and the same shading. The core 125, in this aspect, may include a hollow interior 501 that is shown in dashed line to indicate that the hollow interior 501 may not be present in the particular cross-section taken through the first breast structure 112 and, instead, may be more centrally located in the interior of the torso form 101 (i.e., between the first breast structure 112 and the second breast structure 116). The primary difference between the torso form 101 and the torso form 100 is the integration of the sensor 540 within, for instance, the first breast structure 112 and/or the second breast structure 116. In one example aspect, a length of tubing 560 may be coiled within the first breast structure 112. The tubing 560 may include, for example, flexible silicone tubing that may be coiled a number of times (e.g., two times) and positioned within the first breast structure 112 during the molding process. The sensor 540 and a portion of the sensor lead 548 may be positioned within the tubing 560 and a first end of the tubing 560 may be affixed to, for instance, the first nipple area 114 of the first breast structure 112 as shown in the magnified view. A second end of the tubing 560 may be affixed to the skin layer 511. Coiling the tubing 560 imparts a degree of mechanical stretch to the tubing 560 and prevents inadvertent displacement of the sensor 540 during movement of the first breast structure 112 during testing.

The sensor lead 548 extends through the skin layer 511, passes through an opening 570 in the front of the core 125, and continues on through an opening 572 in the back of the core 125. It is contemplated herein that the opening 570 and the opening 572 provide a through passage through the core 125. In one example aspect, the through passage formed between the openings 570 and 572 may be in communication with the hollow interior 501. Alternatively, the through passage formed between the openings 570 and 572 may not be in communication with the hollow interior 501. After passing through the opening 572, the sensor lead 548 extends superiorly and passes through an opening 574 in the back of the core 125 to terminate within the hollow interior 501 of the core 125. Stated differently, the opening 574 is in communication with the hollow interior 501. The opening 574 is positioned closer to the neck portion 124 of the torso form 101 than the openings 570 and 572. The sensor lead 548 may be accessed by way of a removable cap 576 positioned at the neck portion 124 of the torso form and connected to the processor 550 when testing is desired. When not in use, the sensor lead 548 may remain stowed within the hollow interior 501 of the core 125. Alternatively, the sensor lead 548 may remain connected to the processor 550, and the sensor lead 548 and processor 550 may be stowed within the hollow interior 501 of the core 125 when not in use.

The torso form 101 may also include a fill tube 578 formed from, for example, silicone and having an internal diameter greater than the internal diameter of the tubing 560 used to contain the sensor 540 and the sensor lead 548 (e.g., one-quarter inch versus one-eight inch). The fill tube 578 may be used to deposit or withdraw the breast surrogate material 512 in the first breast structure 112 in order to change the size of the first breast structure 112. In example aspects, a first end of the fill tube 578 may be positioned within the cavity 513. The fill tube 578 may then extend through the skin layer 511, pass through the opening 570 and the opening 572 of the core 125 and then pass through the opening 574 to terminate in the hollow interior 501 of the core 125. As such, the fill tube 578 may travel generally the same route as the sensor lead 548 in the torso form 101. When it is desired to deposit or withdraw the breast surrogate material 512 in the first breast structure 112, the fill tube 578 may be accessed by removing the removable cap 576. When not in use, the fill tube 578 may remain stowed within the hollow interior 501 of the core 125. Discussion regarding the tubing 560, the sensor 540, the sensor lead 548, and the fill tube 578 with respect to the first breast structure 112 may be equally applicable to the second breast structure 116. For instance, it is contemplated that the second breast structure 116 may also include a fill tube to deposit and withdraw the breast surrogate material 512 in the second breast structure 116. Further, in example aspects, the second breast structure 116 may also include a sensor that is positioned within a tubing.

Routing the sensor lead 548 and the fill tube 578 to the back of the torso form 101 before positioning the terminal ends of the respective sensor lead 548 and fill tube 578 within the hollow interior 501 of the core 125 helps to minimize inadvertent movement of the sensor lead 548 and the fill tube 578. For instance, movement of the first and second breast structures 112 and 116 during testing could inadvertently cause displacement of the sensor lead 548 and the fill tube 578 if they were positioned at the front of the torso form 101.

With continued respect to FIG. 5D, in example aspects, the first breast structure may include a first insert 580. A front view of the first insert 580 is depicted in FIG. 5E and depicts the first insert 580 having an inverted "U" shape such that the first insert 580 extends from a lateral aspect of the first breast structure 112, around the top of the first breast structure 112, and around the medial aspect of the first breast structure 112. The first insert 580 may be molded from, for instance, silicone rubber and positioned within the cavity 513 during the casting process. In example aspects, the first insert 580 may provide structural integrity to the first breast structure 112 and may help minimize inadvertent tearing of the skin layer 510 during movement of the first breast structure 112 during testing. A similar insert may be used for the second breast structure 116.

The first breast structure 112 further includes a second insert 582. In example aspects, the second insert 582 may be molded from, for example, silicone rubber and positioned within the cavity 513 during the casting process. As shown in FIG. 5F, which is a front view of the second insert 582, the second insert 582 has a generally crescent shape and is positioned within the first breast structure 112 so that it forms the lower part of the first breast structure 112. Similar to the first insert 580, the second insert 582 may provide structural integrity to the lower part of the first breast structure 112 especially during the testing process. As well, the second insert 582 may be positioned within the cavity 513 so that it helps to create a desired contour for the lower part of the first breast structure 112.

A front perspective view of the core 125 used in, for instance, the torso form 100 and/or the torso form 101 is illustrated in FIG. 6A. A back perspective view of the core 125 is shown in FIG. 6B. The hollow interior 501 of the core 125 is shown in dashed line to indicate it is generally hidden from view when viewing the front or back of the core 125. Although not shown, in example aspects, the hollow interior 501 of the core 125 may extend to the mounting structure 132. As shown, the core 125 may, in example aspects, have a form similar to the torso form 100 or the torso form 101 although other forms are contemplated herein such as, for example, a cylindrical or rectangular form without arm portions or a neck portion. Any and all aspects, and any variation thereof, are contemplated as being within aspects herein. In example aspects, the core 125 may include a polystyrene foam through which an optional hollow container 610, which may be formed from a metal material, may extend to form the hollow interior 501. As well, the core 125 may include the mounting structure 132. Example aspects further contemplate forming the core 125 from a polyurethane machinable foam (sometimes referred to a "butterboard") which is an open cell foam with a very small pore size. The small pore size allows for some ingress of the silicone material used to form the muscle layer 514 promoting adhesion between the core 125 and the muscle layer 514 and reducing delamination between the layers. In example aspects, the polyurethane foam has a density from about 15 lbs/ft$^3$ to about 25 lbs/ft$^3$, from about 16 lbs/ft$^3$ to about 24 lbs/ft$^3$, from about 17 lbs/ft$^3$ to about 23 lbs/ft$^3$, from about 18 lbs/ft$^3$ to about 22 lbs/ft$^3$, from about 19 lbs/ft$^3$ to about 21 lbs/ft$^3$, or about 20 lbs/ft$^3$ with a Shore A hardness of from about 30 to about 40, from about 31 to about 39, from about 32 to about 38, from about 33 to about 37, or about 36. The mounting structure 132 is shown at the bottom of the core 125. In one aspect, the mounting structure 132 may be integrally formed with the container 610 that forms the hollow interior 501 such that they form a single piece construction (not shown). Alternatively, the mounting structure 132 may be a separate piece that is secured to the core 125 in a post-casting step.

FIG. 6A depicts the openings 570 through which the fill tubes 578 and/or sensor leads 548 from the first breast structure 112 and the second breast structure 116 may extend. As shown, the openings 570 are positioned on each lateral side of the container 610 and are not in communication with the hollow interior 501. Aspects herein also contemplate the openings 570 being in communication with the hollow interior 501. Example fill tubes 578 and sensor leads 548 are shown positioned within the openings 570. The back of the core 125 includes the openings 572 that form a through passage with the openings 570. As shown, the fill tubes 578 and the sensor leads 548 extend from the openings 572 and travel superiorly to enter the hollow interior 501 of the container 610 by way of the opening 574. Users can access the fill tubes 578 and the sensor leads 548 by removing the removable cap 576. As stated earlier, the fill tubes 578 are used to deposit or withdraw breast surrogate material 512 in the first breast structure 112 and/or the second breast structure 116. The sensor lead(s) 548 may be accessed to, for instance, connect the sensor lead(s) to the processor 550.

Figure 7:
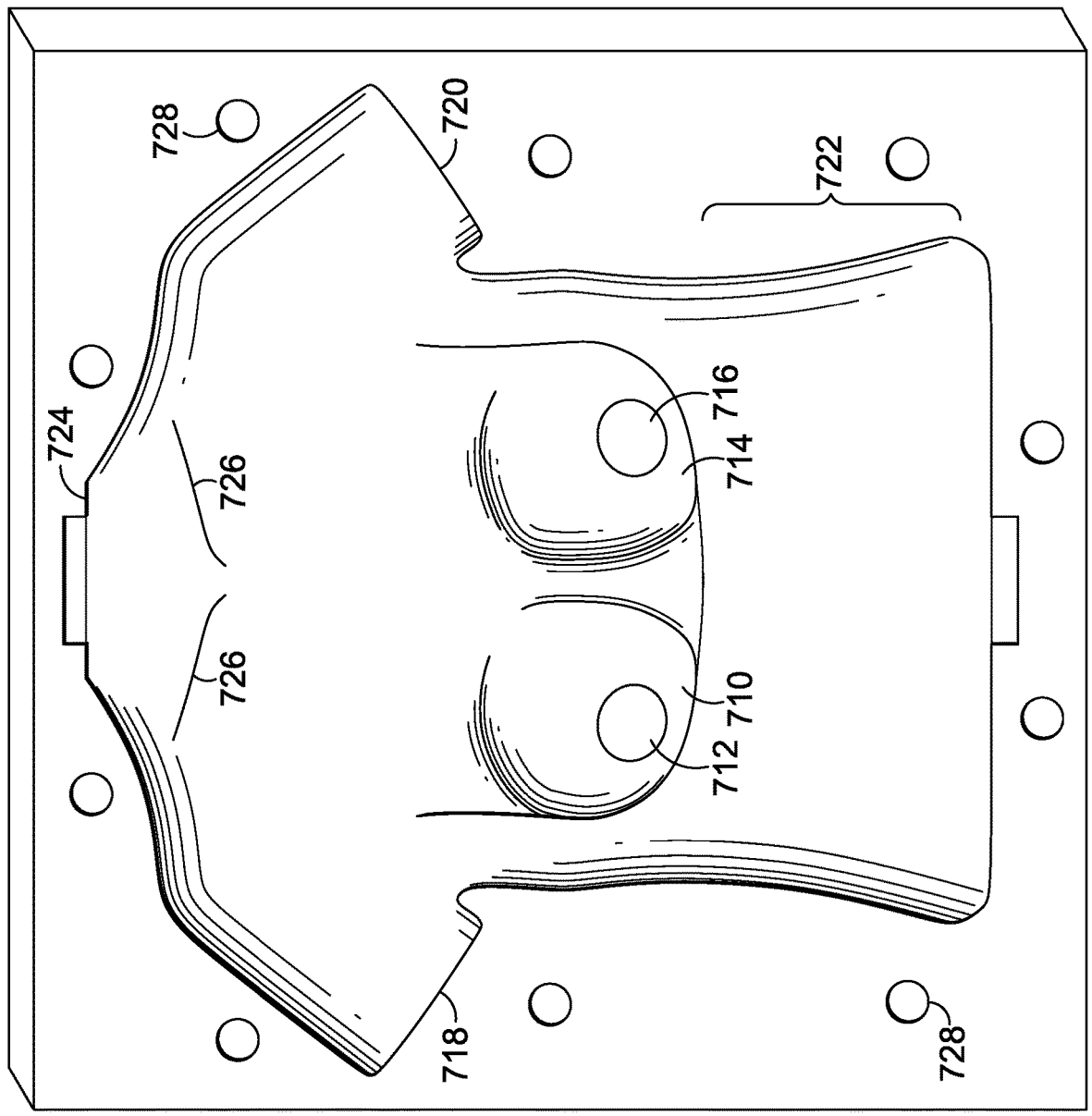
FIG. 7 illustrates a view of a front mold for use in forming example torso forms in accordance with aspects herein.
Figure 8:
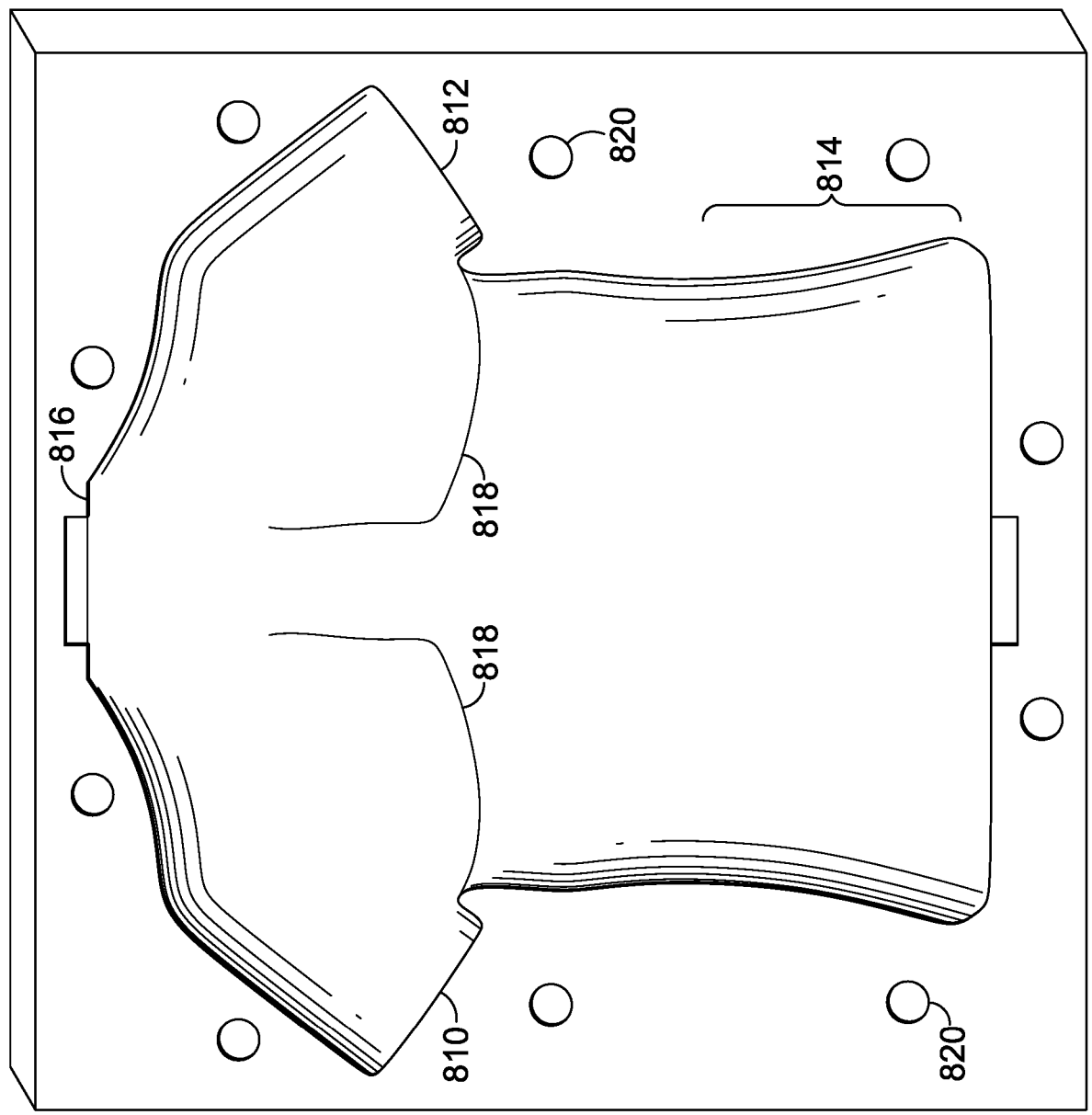
FIG. 8 illustrates a view of a back mold for use in forming the example torso forms in accordance with aspects herein.

FIGS. 7 and 8 depict front and back molds 700 and 800 respectively that are used to cast the torso form 100 and/or the torso form 101. With respect to the front mold 700, in example aspects, the front mold 700 is formed based on three-dimensional (3-D) scans of human females. The 3-D scans may include a composite of different female forms or may include an example female form.

The front mold 700 and the back mold 800 may, in example aspects, comprise metal molds such as steel although other material compositions are contemplated herein. Both the front mold 700 and the back mold 800 include impressions used to create the torso form 100 and/or the torso form 101. For example, the front mold 700 includes a first breast cavity 710 having an optional nipple area 712, and a second breast cavity 714 having an optional nipple area 716. In example aspects, when the torso form 100 is casted to have a depression at the first and second nipple areas 114 and 118 as shown in FIG. 5A, the nipple areas 712 and 716 for the front mold 700 may comprise projections instead of depressions. The front mold 700 also includes first and second arm portions 718 and 720, a waist portion 722, and a neck portion 724. The front mold 700 may also include other anatomical features such as clavicles 726. The back mold 800 includes first and second arm portions 810 and 812, a waist portion 814, and a neck portion 816. The back mold 800 may further include anatomical features such as scapula 818. Both the front mold 700 and the back mold 800 may include attachment features such as those indicated by reference numerals 728 and 820 respectively that enable the front mold 700 to be releasably coupled to the back mold 800 during the casting of the torso form 100 using for instance, screws, nuts/bolts, clamps, and the like.

Figure 9:
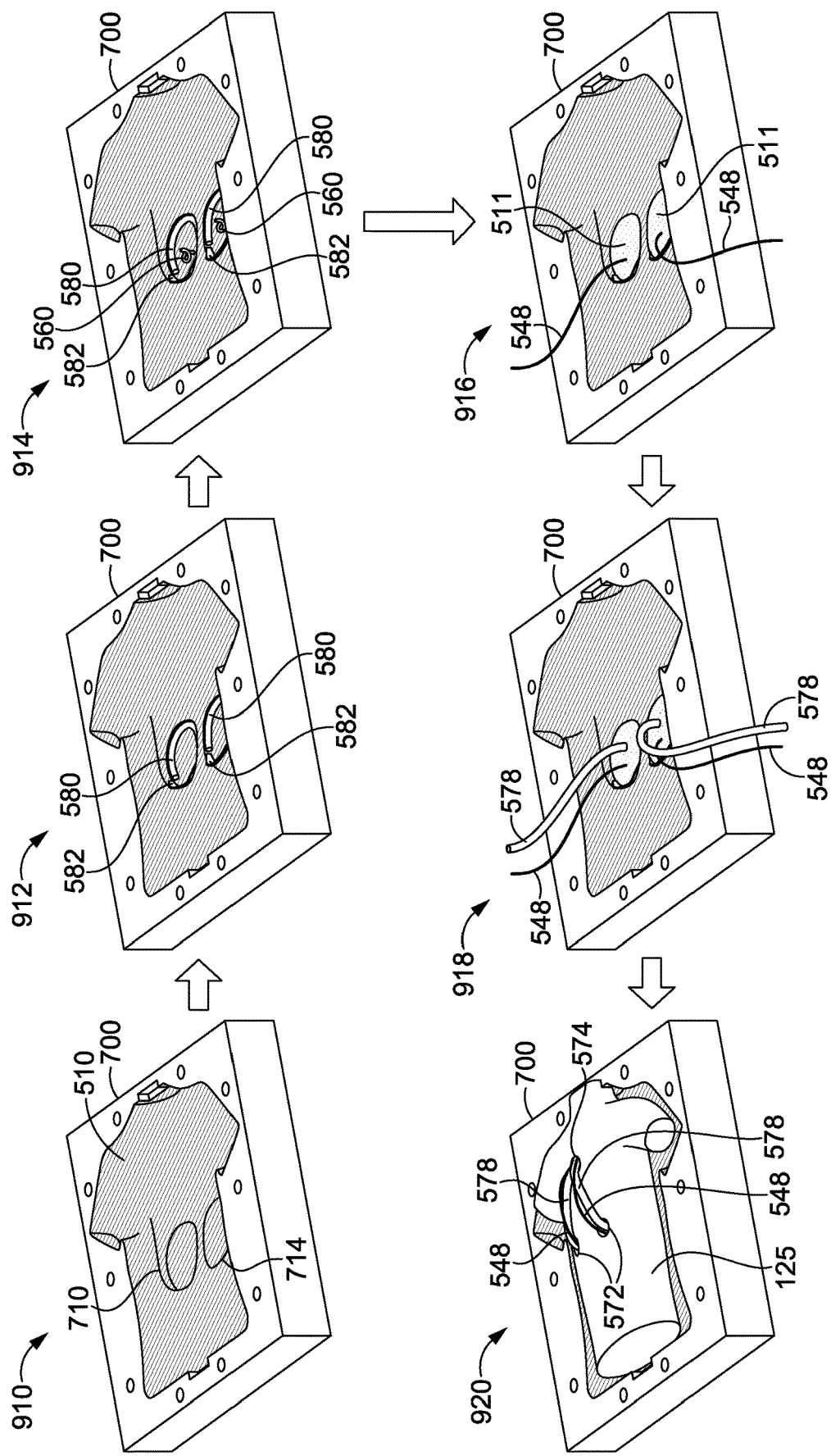
FIG. 9 illustrates an example process for forming a front portion of an example torso form using the front mold of FIG. 7 in accordance with aspects herein.

FIG. 9 depicts a series of steps that may be used to form the front torso area 110 of, for example, the torso form 101. Some or all of the steps shown in FIG. 9, with modification, may also be used to mold the torso form 100. At step 910 a skin layer, such as the skin layer 510, is applied to the front mold 700 as shown by the positively sloped hatching. Application may be a manual process or an automated process and may include painting, spraying, rolling, and the like and may include applying the skin layer 510 as one layer or multiple layers. In one aspect, a compression molding process may be used to ensure the skin layer 510 comprises a uniform thickness in one or more different areas. In this process, the skin layer 510 is applied to the front mold 700 and a second mold is pressed into the front mold 700. As stated above, the skin layer 510 may include different thicknesses at different areas of the torso form 100. As such, the skin layer 510 may be applied as a first thickness in the first and second breast cavities 710 and 714 and as a second thickness in remaining areas of the front mold 700 where the second thickness is greater than the first thickness. In one aspect, a greater thickness may be achieved by applying multiple layers.

At a step 912, the first insert 580 is positioned in each of the first and second breast cavities 710 and 714 such that the first insert 580 extends around a lateral side, an upper part, and a medial side of the first and second breast cavities 710 and 714. The first insert 580 may be secured in place using, for example, a silicone sealant. Additionally, the second insert 582 is positioned at a lower part of the first and second breast cavities 710 and 714 and secured in place using, for example, a silicone sealant.

At a step 914, the tubing 560 with the sensor 540 and sensor lead 548 positioned therein is placed in the first and second breast cavities 710 and 714. Although shown as being positioned within both of the first and second breast cavities 710 and 714, it is contemplated herein, that the tubing 560, the sensor 540, and the sensor lead 548 may be positioned within just one of the first or second breast cavities 710 or 714. A first end of the tubing 560 containing the sensor 540 is secured to the first and second nipple areas 712 and 716 of the front mold 700 using, for example, a silicone sealant. The tubing 560 with the sensor lead 548 may be coiled in one or more loops. At a step 916, the skin layer 511 is positioned over the first and second breast cavities 710 and 714 and a second end of the tubing 560 is secured to a surface of the skin layer 511 that faces the first and second breast cavities 710 and 714 using, for example, a silicone sealant. The sensor lead 548 extends through the skin layer 511 and is sealed to the skin layer 511 using, for example, a silicone sealant.

At a step 918, a slit is made through the skin layer 511 and a first end of the fill tube 578 is inserted through the slit so that the first end is positioned within the first and second breast cavities 710 and 714. Sealant is used to seal the slit to the skin layer 511. The step 918 may additionally include pressurizing each of the first and second breast cavities 710 and 714 using the fill tubes 578 to ensure the first and second breast cavities 710 and 714 are sealed. An example pressure range is from about 1 psi to about 4 psi, from about 1 psi to about 3 psi, or about 2 psi.

At a step 920, the core 125 is positioned within the front mold 700. In example aspects, the core 125 may be secured to the front mold 700 using, for example, bolts. The sensor lead(s) 548 and the fill tubes 578 are routed through the opening 570 on the front of the core 125 (not shown), through the openings 572 on the back of the core 125, and through the opening 574 on the back of the core 125 to terminate within the hollow interior 501 of the core 125. Once positioned within the front mold 700, at least the opening 574 is plugged to prevent the material forming the muscle layer 514 from entering the hollow interior 501 of the core 125.

Figure 10:
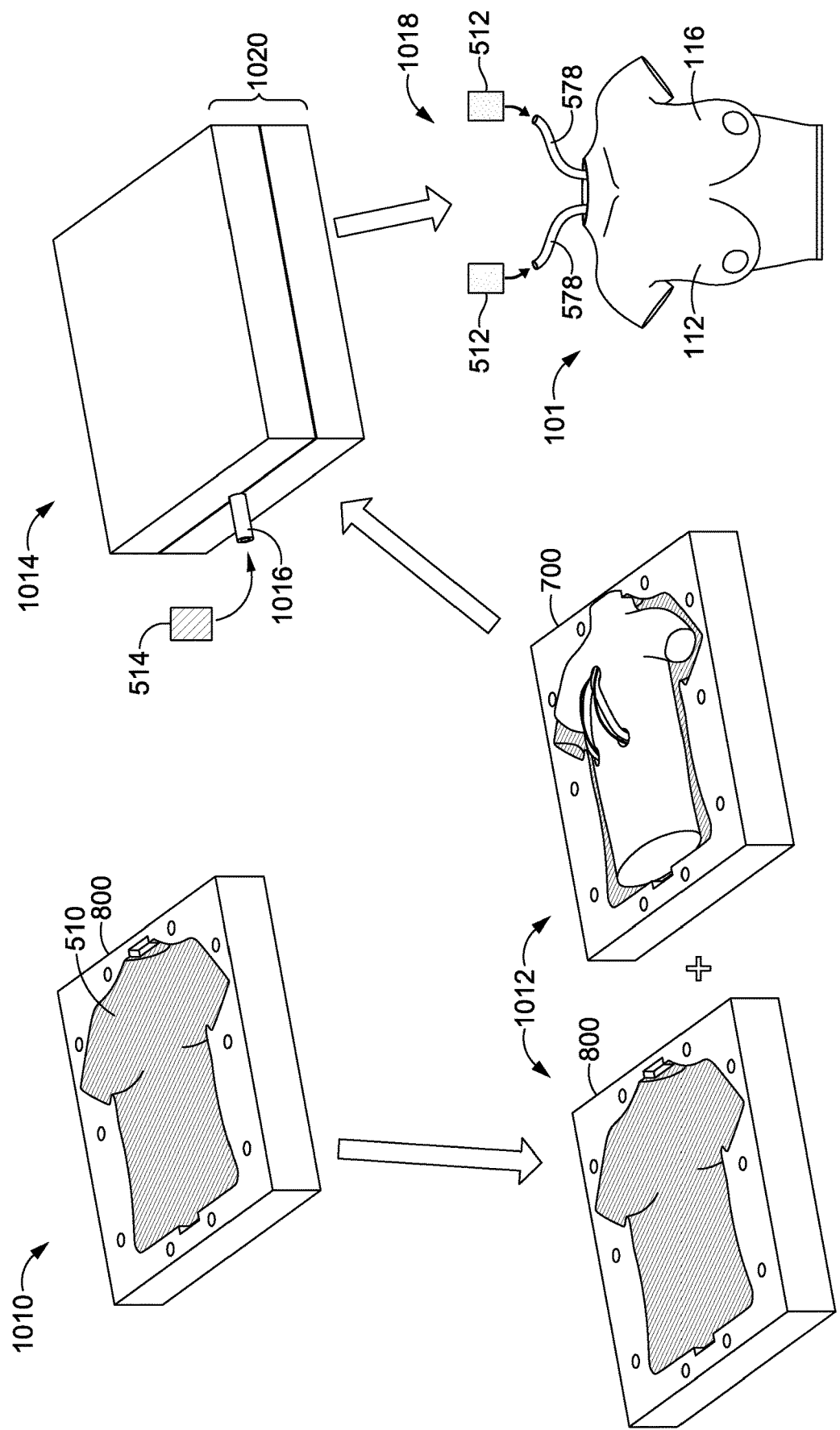
FIG. 10 illustrates an example process for forming the example torso form that utilizes the front mold of FIG. 7 and the back mold of FIG. 8 in accordance with aspects herein.

FIG. 10 illustrates a series of steps used to form the back torso area 210 of the torso form 100 and/or the torso form 101 and steps used to complete the casting of the torso form 100 and/or the torso form 101. At step 1010, a skin layer, such as the skin layer 510 is applied to the back mold 800. Similar to above, this may be a manual or an automated process and may include brushing, spraying, rolling, compression molding, and the like. In example aspects, because the back torso area of a human wearer may not displace much during movement, the skin layer 510 may comprise a thickness that is greater than, for instance, the thickness of the skin layer 510 in the first and second breast cavities 710 and 714. Moreover, the skin layer 510 in the back mold 800 may comprise a uniform thickness in accordance with aspects herein.

At step 1012, the front mold 700 and the back mold 800 may be joined together to form a mold assembly 1020 as shown at step 1014. The front mold 700 and the back mold 800 may be joined together using screws, nuts/bolts, clamps, and the like. The mold assembly 1020 may include a port 1016 through which materials used to form a muscle layer, such as the muscle layer 514 are introduced into a mold space created by the joining of the front mold 700 and the back mold 800. The muscle layer 514 is introduced by pouring the material into the mold space and/or injecting the material into the mold space although other ways of introducing the muscle layer material into the mold space are contemplated herein. Once the mold assembly 1020 is disassembled, the torso form 100 and/or the torso form 101 is casted. At a step 1018, the fill tubes 578 are accessed by removing the removable cap 576, and the breast surrogate material 512 is added to the first and second breast structures 112 and 116 by way of the fill tubes 578. As previously mentioned, the fill tubes 578 may also be used to withdraw at least a portion of the breast surrogate material 512 to cause the first and second breast structures 112 and 116 to have a smaller size.

Although not shown in FIGS. 9 and 10, with respect to the torso form 100 it is contemplated herein that the casting process may comprise additional steps such as introducing conduit tubes, such as the conduit tube 542 during the casting process, introducing ports, such as the ports 214 and 216 during the casting process, introducing sensor receptacles, such as the sensor receptacle 113 during the casting process, introducing the transition inserts 518 during the casting process, and the like. Additionally, although not shown, and with respect to the torso forms 100 and 101, the casting process may also include introducing registration marks, such as the registration marks 122. Any and all aspects, and any variation thereof, are contemplated as being within the scope herein.

Figure 11:
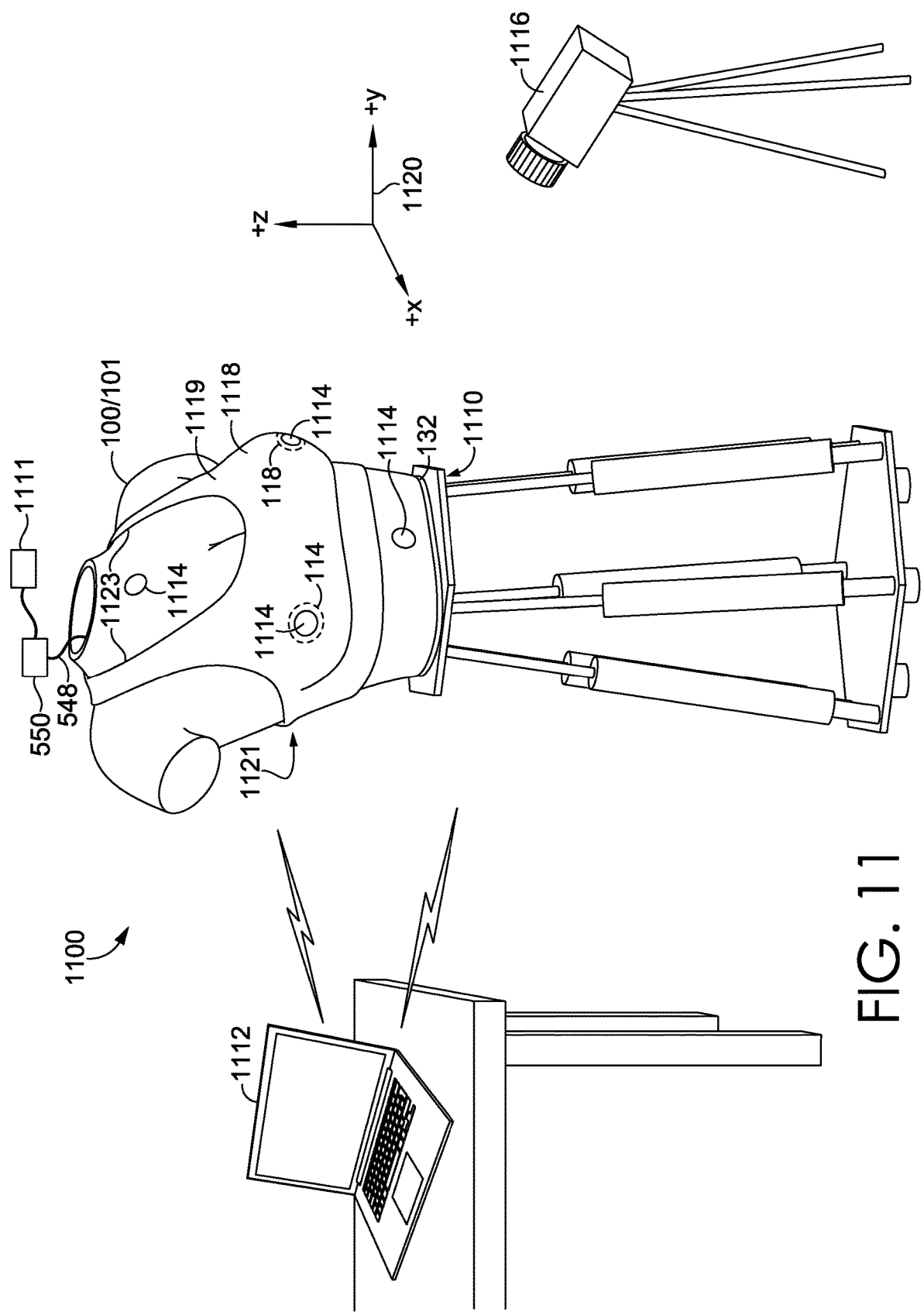
FIG. 11 illustrates an example support garment testing system in accordance with aspects herein.

Turning now to FIG. 11, an example support garment testing system is depicted and is referenced generally by the numeral 1100. The support garment testing system 1100 includes at least the torso form 100/101 with its mounting structure 132 and its integrated sensor 540 with the sensor lead 548 and the processor 550, a motion platform 1110, a computing system 1112, optional external markers 1114, and an optional motion capture system 1116. The support garment testing system 1100 may further include a transmitter 1111 that emits electromagnetic fields that are sensed by the sensor 540; the transmitter 1111 may also be electronically or communicatively coupled to the processor 550. In example aspects, the transmitter 1111 is positioned within about 1 meter of the sensor 540 and an example location may comprise the neck portion 124 of the torso form 100/101. The sensor system including the sensor 540, the sensor lead 548, the processor 550, and the transmitter 1111 may be communicatively coupled to the computing system 1112 as described below with respect to FIG. 14.

Aspects associated with the torso form 100/101 have been set forth herein and, as such, will not be repeated here. In example aspects, a support garment 1118 is positioned on the torso form 100/101. The support garment 1118 includes a front portion 1119, a back portion 1121 extending from the front portion 1119, and a pair of shoulder straps 1123 extending between the front portion 1119 and the back portion 1121. The support garment 1118 is positioned on the torso form 100/101 such that the front portion 1119 covers, at least in part, the first and second breast structures 112 and 116. As set forth above, various features of the torso form 100/101 may be used to properly position the support garment 1118 on the torso form 100. For instance, anatomical features such as the first and second nipple areas 114 and 118, the clavicles 120, and the scapula 212 may be used to guide placement, and, if the torso form 100 comprises the registration marks 122, the registration marks 122 may also be used to guide placement. In example aspects, the support garment 1118 may be a bra such as a sport bra but may include other constructions such as a tank top, a camisole, a bandeau, a bralette, and the like. The depiction of the support garment 1118 is illustrative only, and it is contemplated herein that the support garment 1118 may include other constructions than that shown. The torso form 100/101 may be removably secured to the motion platform 1110 by way of the mounting structure 132.

The motion platform 1110 is configured to move through six degrees of motion with pre-specified velocities, frequencies, and/or degrees of movement or rotation. A Cartesian coordinate system 1120 is provided for reference where the z-axis is oriented parallel to gravity with +z oriented opposite of gravity, the y-axis is aligned with a medial/lateral axis of the torso form 100 with +y oriented in a left lateral direction, and the x-axis is aligned with the anterior/posterior axis of the torso form 100 with +x oriented in the anterior direction. Movement of the motion platform 1110 may occur in the +z direction and the −z direction, the +y direction and the −y direction, the +x direction and the −x direction. Movement of the motion platform 1110 may also include rotation around the z-axis (yaw), rotation around the y-axis (pitch), and rotation around the x-axis (roll). In example aspects, the motion platform 1110 may also be communicatively coupled to the computing system 1112 such that the computing system 1112 may be used to instruct the motion platform 1110 to move through a sequence of predetermined motions with a predetermined velocity and/or frequency.

As described above, the motion platform 1110 may move through different motions to simulate different activities. Simulation of different activities may dictate different stroke distances, different excursion degrees, different velocities and/or frequencies, and/or different excursion rates.

To test the level of support provided by the support garment 1118, the motion platform 1110 is actuated to cause the torso form 100/101 to move through different predetermined linear and rotational movements both with and without the support garment 1118 positioned on the torso form 100/101. For example, the motion platform 1110 may be actuated in a first test cycle where the torso form 100/101 does not have the support garment 1118 positioned thereon. In other words, the first test cycle may simulate displacement of the first and second breast structures 112 and 116 in a "braless" state or a state where there is no external support being provided to the first and second breast structures 112 and 116. The motion platform 1110 is then stopped and the support garment 1118 is secured to the torso form 100/101. The motion platform 1110 is again actuated in a second test cycle to simulate displacement of the first and second breast structures 112 and 116 when receiving support from the support garment 1118. The linear and rotational displacement along with the frequency and velocity of movement of the first and second breast structures 112 and 116 are measured using the sensor 540 in both the first test cycle and the second test cycle.

In example aspects, the duration of the first and second test cycles as well as the movement of the motion platform 1110 during the first and second test cycles may be the same. In one example aspect, the motion platform 1110 may move through about 100 cycles (linear, rotational, or both) which generally comprises a duration of around one minute. During both the first and second test cycles, the sensor 540 measures the linear and rotational displacement of the first and second breast structures 112 and 116 as well as, for example, the velocity of movement and/or the frequency of movement, and communicates the data to the computing system 1112. The data is analyzed by the computing system 1112 and a level of support provided by the support garment 1118 is determined. In one example aspect, the level of support is determined by comparing the amount of displacement experienced by the first and second breast structures 112 and 116 during the first test cycle (e.g., the "braless" state) with the amount of displacement experienced by the first and second breast structures 112 and 116 during the second test cycle (e.g., where the support garment 1118 is donned). If the difference in displacement experienced by the first and second breast structures 112 and 116 during the first and second test cycles falls within a first predefined range, the support garment 1118 may be determined to be a "high" support garment. If the difference in displacement experienced by the first and second breast structures 112 and 116 during the first and second test cycles falls within a second predefined range, the support garment 1118 may be determined to be a "medium" support garment. And if the difference in displacement experienced by the first and second breast structures 112 and 116 during the first and second test cycles falls within a third predefined range, the support garment 1118 may be determined to be a "low" support garment. These are just examples only, and it is contemplated that other classification schemes may be used in accordance with aspects herein.

In an optional aspect, external markers 1114 may be positioned on the torso form 100/101 for motion capture by way of, for instance, the motion capture system 1116. In example aspects, the external markers 1114 may be positioned as shown in FIG. 11. For instance, the external markers 1114 may be positioned at the upper sternum/lower neck of the torso form 100/101, at the first and second nipple areas 114 and 118, and at the lower abdomen although other placement locations are contemplated herein. The movement of the external markers 1114 may be captured using, for instance, the motion capture system 1116. In one aspect, the motion capture system 1116 includes a video camera that samples the movement of the external markers 1114 on a continuous basis. The data captured by the motion capture system 1116 may be communicated to the computing system 1112 where it is analyzed and may be used to further refine the level of support assigned to a particular support garment such as the support garment 1118.

Other sensor systems are contemplated herein that may be used in combination with the motion tracking sensor system or that alternatively may be used instead of the motion tracking sensor system to assign a level of support to a support garment or to assign additional attributes to the support garment. For example, stretch sensors may be used to determine the degree of elongation of the skin layer 510 of the first and second breast structures 112 and 116 both with and without the support garment 1118 during movement of the motion platform 1110. As well, load sensors may be used to determine the force exerted by the support garment 1118 on the torso form 100 during movement of the motion platform 1110. Any and all aspects, and any variation thereof, are contemplated as being within aspects herein.

Although not shown, the support garment testing system 1100 may include additional features, including safety features, such as, for example, an enclosure around the torso form 100/101 and the motion platform 1110 where the enclosure provides an ingress/egress point so that users can interact with the torso form 100/101 and the motion platform 1110. In other aspects, the enclosure may be just around the motion platform 1110. When an enclosure is used for both the torso form 100/101 and the motion platform 1110, the enclosure may include a plexiglass casing to allow a 360 degree view of the torso form 100/101. Use of a plexiglass casing may also enable the optional motion capture system 1116 to be positioned at various locations around the torso form 100/101 (front, back, sides). An additional safety feature may include an emergency stop to halt movement of the motion platform 1110. As well, the computing system 1112 may be mounted to, for instance, the casing for a self-contained system.

Figure 12:
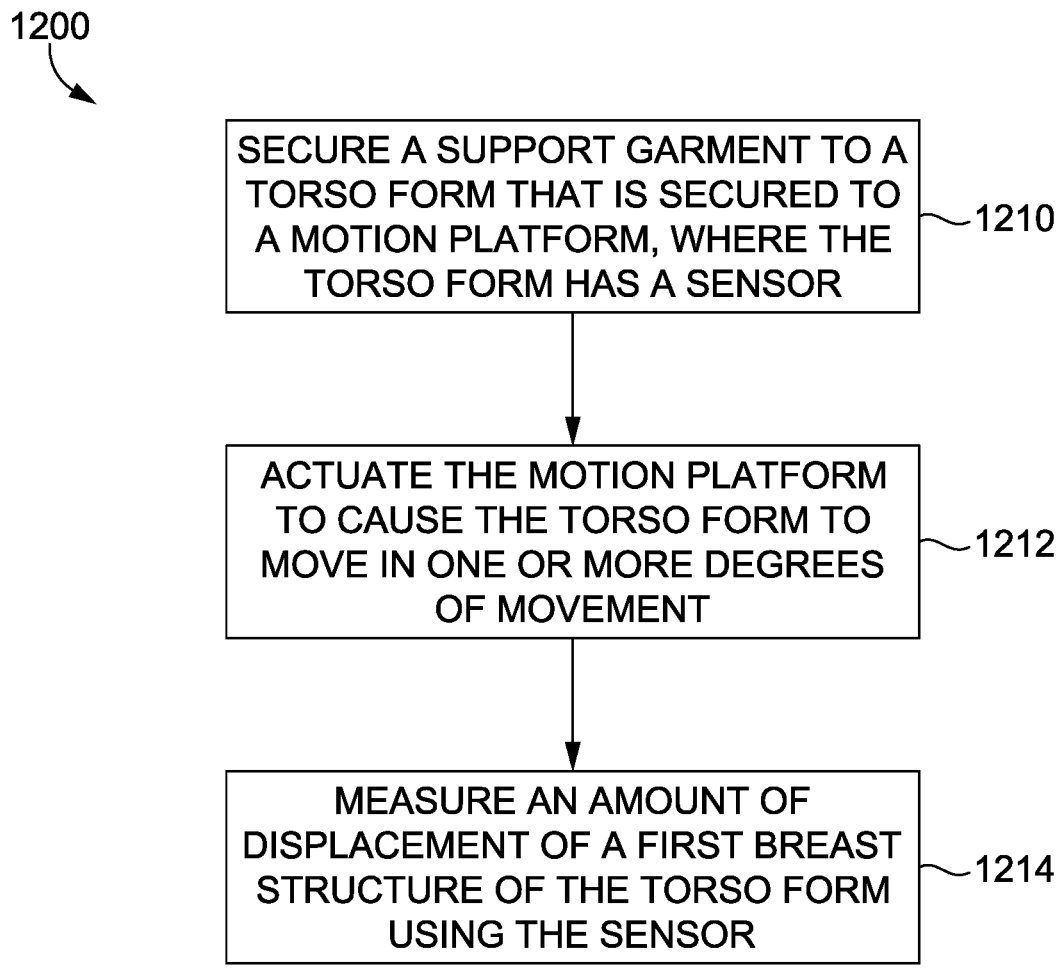
FIG. 12 illustrates a flow diagram of an example method of testing a level of support provided by a support garment in accordance with aspects herein.

FIG. 12 depicts a flow diagram outlining an example method 1200 of determining a level of support provided by a support garment. At a step 1210, a support garment, such as the support garment 1118, is secured to a torso form, such as the torso form 100 or the torso form 101. Before or after the support garment is secured to the torso form, the torso form is releasably secured to a motion platform, such as the motion platform 1110 by way of a mounting structure, such as the mounting structure 132, secured to the bottom of the torso form. At a step 1212, the motion platform is actuated to cause the torso form to move in one or more degrees of movement. As described above, the motion platform may be actuated to move through a predetermined sequence of movements designed to simulate an athletic activity. Moreover, the motion platform may be actuated for a predetermined length of time. At a step 1214, an amount of displacement (both linear and rotational), the velocity of displacement, and/or the frequency of displacement experienced by the torso form breast structures, such as the first and second breast structures 112 and 116 is measured using a sensor, such as the sensor 540.

The method 1200 may additionally include capturing the same variables (the amount of displacement (both linear and rotational), the velocity of displacement, and/or the frequency of displacement) using the sensor when the torso form is in a "braless" state or a state where the support garment is not secured to the torso form. A comparison of the displacement data between the two testing cycles is performed using a computing system, such as the computing system 1112, and, based on the comparison, the support garment is assigned a level of support. The method 1200 provides a measurable and reproducible way of assigning a level of support to a particular support garment.

Figure 13:
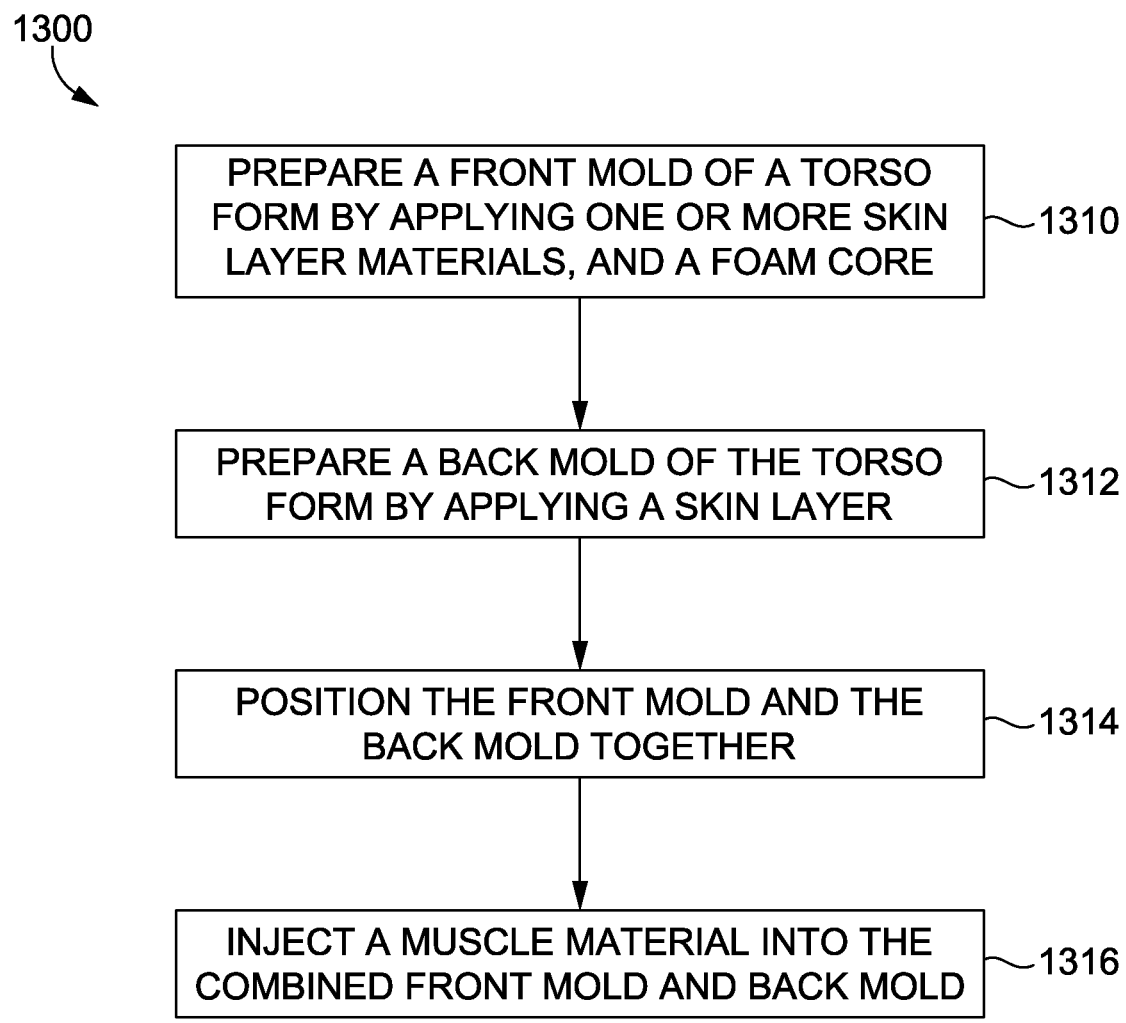
FIG. 13 illustrates an example method of manufacturing a torso form for use in a support garment testing system in accordance with aspects herein.

FIG. 13 depicts a flow diagram outlining an example method 1300 of casting a torso form such as the torso form 100. At a step 1310, a mold for the front torso area of the torso form is prepared by applying a skin layer, such as the skin layer 510 to the front mold. The step 1310 may additionally include positioning one or more inserts such as the first insert 580 and the second insert 582 within the breast cavities, and positioning and securing tubing, such as the tubing 560, containing a sensor and sensor lead within one or more both of the first and second breast cavities. The step 1310 also includes applying an interior skin layer, such as the skin layer 511 to seal the first and second breast cavities. Fill tubes, such as fill tubes 578, may be inserted through the interior skin layer such that the tip of the fill tubes is positioned within the first and second breast cavities. Next, a core, such as the core 125, is positioned in the front mold. The sensor lead(s) and the fill tubes may be routed through the core as shown in FIG. 9.

At a step 1312, a mold for the back torso area of the torso form is prepared by applying a skin layer, such as the skin layer 510 to the back mold. Next, at a step 1314, the front mold and the back mold are positioned together to form a mold assembly, such as the mold assembly 1020. And at a step 1316, a muscle layer material is injected or deposited in the mold assembly. The method 1300 may additionally include decoupling the front and back molds to release the torso form, accessing the fill tubes by removing a removable cap from the neck portion of the torso form, and depositing a breast surrogate material within the first and second breast structures.

Figure 14:
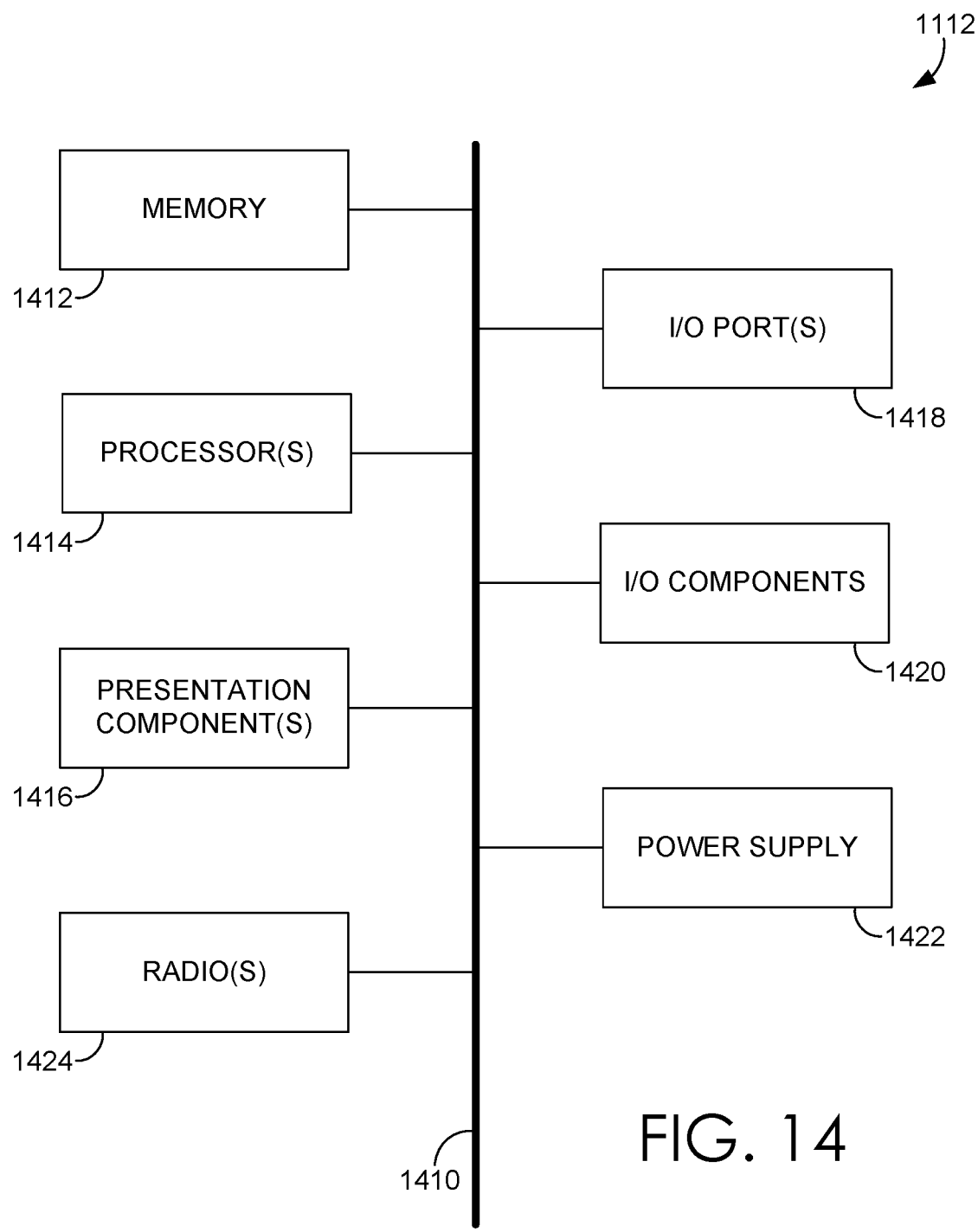
FIG. 14 illustrates a block diagram of an example computing environment suitable for use in implementing aspects described herein.

With reference to FIG. 14, the computing system 1112 includes a bus 1410 that directly indirectly couples the following devices: memory 1412, one or more processors 1414, one or more presentation components 1416, one or more input/output (I/O) ports 1418, one or more I/O components 1420, and an illustrative power supply 1422. The bus 1410 represents what may be one or more busses (such as an address bus, data bus, or combination thereof). Although the various blocks of FIG. 14 are shown with lines for the sake of clarity, in reality, these blocks represent logical, not necessarily actual, components. For example, one may consider a presentation component such as a display device to be an I/O component. Also, processors have memory. Aspects herein recognize that such is the nature of the art and reiterate that the diagram of FIG. 14 is merely illustrative of an example computing system that can be used in connection with one or more aspects of the present technology. Distinction is not made between such categories as "workstation," "server," "laptop," "handheld device," etc., as all are contemplated within the scope of FIG. 14 and with reference to "computing system."

The computing system 1112 typically includes a variety of computer-readable media. Computer-readable media can be any available media that can be accessed by computing system 1112 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by the computing system 1112. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1412 includes computer storage media in the form of volatile and/or nonvolatile memory. The memory may be removable, non-removable, or a combination thereof. Exemplary hardware devices include solid-state memory, hard drives, optical-disc drives, etc. The computing system 1112 includes one or more processors 1414 that read data from various entities such as memory 1412 or I/O components 1420. Presentation component(s) 1416 presents data indications to a user or other device. Example presentation components include a display device, speaker, printing component, vibrating component, and the like.

The I/O ports 1418 allow the computing system 1112 to be logically coupled to other devices, including I/O components 1420, some of which may be built in. Illustrative components include a microphone, joystick, game pad, satellite dish, scanner, printer, wireless device, a motion tracking sensor, such as the sensor 540, a motion platform, such as the motion platform 1110, a motion capture system, such as the motion capture system 1116, and the like.

The I/O components 1420 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing system 1112. The computing system 1112 may be equipped with depth cameras, such as stereoscopic camera systems, infrared camera systems, RGB camera systems, and combinations of these, for gesture detection and recognition. Additionally, the computing system 1112 may be equipped with accelerometers or gyroscopes that enable detection of motion. The output of the accelerometers or gyroscopes may be provided to the display of the computing system 1112 to render immersive augmented reality or virtual reality.

Some aspects of the computing system 1112 may include one or more radio(s) 1424 (or similar wireless communication components). The radio 1424 transmits and receives radio or wireless communications. The computing system 1112 may be a wireless terminal adapted to receive communications and media over various wireless networks. The computing system 1112 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When referring to "short" and "long" types of connections, it is not meant to refer to the spatial relation between two devices. Instead, it refers to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth® connection to another computing device is a second example of a short-range connection, or a near-field communication connection. A long-range connection may include a connection using, by way of example and not limitation, one or more of CDMA, GPRS, GSM, TDMA, and 802.16 protocols.

Aspects described herein that relate to creating a human form with materials that mimics human movement and applying a testing paradigm to the human form can be applied to other garment testing scenarios. For instance, a male torso form may be formed to allow for the determination of a support level provided by, for example, a compression short, a lower-body undergarment, a jock strap, and the like. In this example, the male torso form would comprise male genitalia formed from materials that, when incorporated into the male torso form, simulate the natural movement of male genitalia that occurs during athletic activities such as, for example, running. A sensor, such as a motion tracking sensor, may be associated with the male genitalia including placement of the sensor at the head of the penis. Similar to above, the male torso form may be mounted to a motion platform and displacement data may be captured when a support garment is secured to the male torso form and when the male torso form does not include a support garment. A comparison of displacement data between the two tests may provide an indication of support provided by the support garment. Any and all aspects, and any variation thereof, are contemplated as being within aspects herein.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A support garment testing system comprising: a torso form having a first breast structure and a second breast structure; a motion platform, the torso form secured to the motion platform; and a sensor positioned within one or more of the first breast structure and the second breast structure.

Clause 2. The support garment testing system according to clause 1, wherein the torso form is releasably secured to the motion platform.

Clause 3. The support garment testing system according to any of clauses 1 through 2, wherein the sensor is a motion tracking sensor.

Clause 4. The support garment testing system according to any of clauses 1 through 3, wherein the sensor is positioned within a nipple area of the one or more of the first breast structure and the second breast structure.

Clause 5. The support garment testing system according to any of clauses 1 through 4, the torso form comprising: a foam core positioned at least at an interior portion of the torso form; a muscle layer positioned around at least a portion of the foam core in the interior portion of the torso form; and a skin layer forming an outer surface of the torso form, the skin layer surrounding at least a portion of the muscle layer.

Clause 6. The support garment testing system according to clause 5, wherein the foam core comprises a polystyrene foam.

Clause 7. The support garment testing system according to clause 5, wherein the foam core comprises a polyurethane foam.

Clause 8. The support garment testing system according to clause 7, wherein the polyurethane foam has a density from about 18 lbs/ft$^3$ to about 22 lbs/ft$^3$.

Clause 9. The support garment testing system according to any of clauses 7 through 8, wherein the density is about 20 lbs/ft$^3$.

Clause 10. The support garment testing system according to any of clauses 7 through 9, wherein the polyurethane foam has a Shore A hardness from about 34 to about 37.

Clause 11. The support garment testing system according to any of clauses 7 through 10, wherein the Shore A hardness is about 36.

Clause 12. The support garment testing system according to any of clauses 5 through 11, wherein the muscle layer comprises a silicone material.

Clause 13. The support garment testing system according to clause 12, wherein the silicone material has a storage modulus (G') from about 0.14 MPa to about 0.17 MPa.

Clause 14. The support garment testing system according to any of clauses 12 through 13, wherein the silicone material has a Shore A hardness from about 29 to about 31.

Clause 15. The support garment testing system according to any of clauses 12 through 14, wherein the silicone material has a tensile modulus from about 95% to about 100% at 0.592 MPa.

Clause 16. The support garment testing system according to any of clauses 12 through 15, wherein the silicone material has an elongation at break from about 355% to about 365%.

Clause 17. The support garment testing system according to any of clauses 5 through 16, wherein the skin layer comprises a silicone material.

Clause 18. The support garment testing system according to clause 17, wherein the silicone material has a storage modulus (G') from about 0.55 MPa to about 0.75 MPa.

Clause 19. The support garment testing system according to any of clauses 17 through 18, wherein the silicone material has a Shore A hardness from about 9 to about 11.

Clause 20. The support garment testing system according to any of clauses 17 through 19, wherein the silicone material has a tensile modulus from about 95% to about 100% at 0.152 MPa.

Clause 21. The support garment testing system according to any of clauses 17 through 20, wherein the silicone material has an elongation at break from about 955% to about 1010%.

Clause 22. The support garment testing system according to any of clauses 5 through 21, wherein the first breast structure and the second breast structure comprise: the skin layer, the skin layer defining a first cavity within the first breast structure and a second cavity within the second breast structure; and a breast surrogate material positioned within the first cavity and the second cavity.

Clause 23. The support garment testing system according to clause 22, wherein the breast surrogate material comprises a dibenzoate plasticizer and a low molecular weight non-phthalate polyvinylcholoride (PVC).

Clause 24. The support garment testing system according to clause 23, wherein the dibenzoate plasticizer and the low molecular weight non-phthalate PVC are mixed in a ratio from about 7:1 to about 20:1 (plasticizer: PVC).

Clause 25. The support garment testing system according to any of clauses 23 through 24, wherein the breast surrogate material has a storage modulus (G') from about 13000 Pa to about 90 Pa.

Clause 26. The support garment testing system according to any of clauses 1 through 25, wherein the torso form comprises a mounting structure positioned on a bottom surface of the torso form.

Clause 27. The support garment testing system according to any of clauses 1 through 26, wherein the torso form comprises one or more registration marks useable for positioning a support garment on the torso form.

Clause 28. A method for testing a level of support provided by a support garment, the method comprising: in a test cycle: securing the support garment to a torso form having a first breast structure and a second breast structure, the torso form secured to a motion platform, the torso form having an integrated sensor; actuating the motion platform to cause the torso form to move in one or more degrees of movement; and measuring a first amount of displacement of one or more of the first breast structure and the second breast structure using the integrated sensor while the motion platform is actuated.

Clause 29. The method for testing the level of support provided by the support garment according to clause 28, wherein the integrated sensor is positioned within the one or more of the first breast structure and the second breast structure.

Clause 30. The method for testing the level of support provided by the support garment according to any of clauses 28 through 29, wherein the integrated sensor is positioned at a nipple area of the one or more of the first breast structure and the second breast structure.

Clause 31. The method for testing the level of support provided by the support garment according to any of clauses 28 through 30, wherein the integrated sensor comprises a motion tracking sensor.

Clause 32. The method for testing the level of support provided by the support garment according to any of clauses 28 through 31, further comprising: positioning at least one marker on an outer surface of the torso form; and capturing movement of the at least one marker using a motion capture system.

Clause 33. The method for testing the level of support provided by the support garment according to clause 32, wherein the at least one marker is positioned at a nipple area of at least one of the first breast structure or the second breast structure.

Clause 34. The method for testing the level of support provided by the support garment according to any of clauses 28 through 33, further comprising comparing the first amount of displacement of the one or more of the first breast structure and the second breast structure with the support garment secured to the torso form with a second amount of displacement of the one or more of the first breast structure and the second breast structure without the support garment secured to the torso form.

Clause 35. The method for testing the level of support provided by the support garment according to clause 34, wherein the second amount of displacement of the one or more of the first breast structure and the second breast structure is measured using the integrated sensor while the motion platform is actuated in a different test cycle.

Clause 36. The method for testing the level of support provided by the support garment according to any of clause 34 through 35, further comprising, assigning a level of support to the support garment based on the comparison of the first amount of displacement and the second amount of displacement.

Clause 37. The method for testing the level of support provided by the support garment according to any of clauses 28 through 36, wherein the one or more degrees of movement comprise linear movement along an x-axis, linear movement along a y-axis, linear movement along a z-axis, rotation around the x-axis, rotation around the y-axis, and rotation around the z-axis.

Clause 38. A method of manufacturing a torso form for use in a support garment testing system, the method comprising: using a front mold and a back mold to cast the torso form, the front mold comprising a first breast structure cavity and a second breast structure cavity, wherein using the front mold and the back mold to cast the torso form comprises: forming a skin layer in the front mold and the back mold; depositing a breast surrogate material in the first breast structure cavity and the second breast structure cavity of the front mold; positioning a core in the front mold; reversibly coupling the front mold and the back mold to form a mold assembly; and depositing a muscle layer in the mold assembly.

Clause 39. The method of manufacturing the torso form for use in the support garment testing system according to clause 38, further comprising: positioning a sensor receptacle in at least one of the first breast structure cavity or the second breast structure cavity of the front mold prior to or during the casting of the torso form.

Clause 40. The method of manufacturing the torso form for use in the support garment testing system according to clause 39, further comprising positioning a sensor within the sensor receptacle.

Clause 41. The method of manufacturing the torso form for use in the support garment testing system according to any of clauses 39 through 40, wherein the sensor receptacle is located at a nipple area of the at least one of the first breast structure cavity or the second breast structure cavity.

Clause 42. A support garment testing system comprising: a torso form having a first breast structure and a second breast structure, the first breast structure and the second breast structure comprising a breast surrogate material and a skin layer, wherein one or more of the first breast structure and the second breast structure include a sensor; and a motion platform, the torso form secured to the motion platform.

Clause 43. The support garment testing system according to clause 42, wherein the sensor comprises a motion tracking sensor.

Clause 44. The support garment testing system according to any of clauses 42 through 43, wherein the sensor is associated with a nipple area of the one or more of the first breast structure and the second breast structure.

Clause 45. The support garment testing system according to any of clauses 42 through 44, wherein the torso form further comprises: a foam core positioned at least at an interior portion of the torso form; and a muscle layer positioned around at least a portion of the foam core in the interior portion of the torso form, wherein the skin layer further forms an outer surface of the torso form, and wherein the skin layer surrounds at least a portion of the muscle layer.

Clause 46. A method for testing a level of support provided by a support garment, the method comprising: in a first test cycle: actuating a motion platform to which a torso form having a first breast structure and a second breast structure is secured, wherein the torso form has an integrated sensor, and wherein actuating the motion platform causes the torso form to move in one or more degrees of movement; and measuring a first amount of displacement of one or more of the first breast structure and the second breast structure using the integrated sensor while the motion platform is actuated; and in a second test cycle: securing the support garment to the torso form; actuating the motion platform to cause the torso form to move in one or more degrees of movement; and measuring a second amount of displacement of the one or more of the first breast structure and the second breast structure using the integrated sensor while the motion platform is actuated.

Clause 47. The method for testing the level of support provided by the support garment according to clause 46, further comprising, assigning a level of support to the support garment based on a comparison between the first amount of displacement and the second amount of displacement.

Clause 48. The method for testing the level of support provided by the support garment according to any of clauses 46 through 47, wherein the motion platform executes substantially the same movements during the first test cycle and the second test cycle.

Clause 49. The method for testing the level of support provided by the support garment according to any of clauses 46 through 48, wherein the support garment comprises a front portion, a back portion extending from the front portion, and a pair of shoulder straps extending between the front portion and the back portion.

Clause 50. The method for testing the level of support provided by the support garment according to clause 49, wherein securing the support garment to the torso form comprises positioning the front portion of the support garment over the first breast structure and the second breast structure.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A support garment testing system comprising:
    a torso form comprising a first breast structure and a second breast structure and a superior/inferior z-axis;
    a motion platform coupled to the torso and linearly actuatable in a direction aligned with the superior/inferior z-axis; and
    a sensor positioned within one or more of the first breast structure and the second breast structure.

2. The support garment testing system of claim 1, wherein the torso form is releasably secured to the motion platform.

3. The support garment testing system of claim 1, wherein the sensor is a motion tracking sensor.

4. The support garment testing system of claim 1, wherein the sensor is positioned within a nipple area of the one or more of the first breast structure and the second breast structure.

5. The support garment testing system of claim 1, the torso form comprising:
    a foam core positioned at least at an interior portion of the torso form;
    a muscle layer positioned around at least a portion of the foam core in the interior portion of the torso form; and
    a skin layer forming an outer surface of the torso form, the skin layer surrounding at least a portion of the muscle layer.

6. The support garment testing system of claim 5, wherein the foam core comprises a polystyrene foam.

7. The support garment testing system of claim 5, wherein the foam core comprises a polyurethane foam.

8. The support garment testing system of claim 5, wherein the muscle layer comprises a silicone material.

9. The support garment testing system of claim 5, wherein the skin layer comprises a silicone material.

10. The support garment testing system of claim 5, wherein the first breast structure and the second breast structure comprise:
    the skin layer, the skin layer defining a first cavity within the first breast structure and a second cavity within the second breast structure; and
    a breast surrogate material positioned within the first cavity and the second cavity.

11. The support garment testing system of claim 10, wherein the breast surrogate material comprises a mixture of polyethylene glycol, alumina power, and tungsten powder.

12. The support garment testing system of claim 1, wherein the torso form comprises a mounting structure positioned on a bottom surface of the torso form.

13. A support garment testing system comprising:
    a torso form having a first breast structure and a second breast structure, the first breast structure and the second breast structure comprising a breast surrogate material and a skin layer, wherein one or more of the first breast structure and the second breast structure include a sensor; and
    a motion platform secured to the torso form, wherein:
        the torso form secured to the motion platform comprises a superior/inferior z-axis, a medial/lateral y-axis, and an anterior/posterior x-axis; and the motion platform, when actuated, rotationally moves the torso relative to one or more of the superior/inferior z-axis or the anterior/posterior x-axis.

14. The support garment testing system of claim 13, wherein the sensor comprises a motion tracking sensor.

15. The support garment testing system of claim 13, wherein the sensor is associated with a nipple area of the one or more of the first breast structure and the second breast structure.

16. A method for testing a level of support provided by a support garment, the method comprising:

in a test cycle:

securing the support garment to a torso form having a first breast structure and a second breast structure, the torso form secured to a motion platform and comprising an integrated sensor, wherein the torso form secured to the motion platform comprises a superior/inferior z-axis, a medial/lateral y-axis, and an anterior/posterior x-axis;

actuating the motion platform to cause the torso form to linearly move in a direction aligned with the superior/inferior z-axis; and measuring a first amount of displacement of one or more of the first breast structure and the second breast structure using the integrated sensor while the motion platform is actuated.

17. The method for testing the level of support provided by the support garment of claim 16, wherein the integrated sensor is positioned within the one or more of the first breast structure and the second breast structure.

18. The method for testing the level of support provided by the support garment of claim 17, wherein the integrated sensor is positioned at a nipple area of the one or more of the first breast structure and the second breast structure.

19. The method for testing the level of support provided by the support garment of claim 16, wherein the integrated sensor comprises a motion tracking sensor.

20. The method for testing the level of support provided by the support garment of claim 16, further comprising comparing the first amount of displacement of the one or more of the first breast structure and the second breast structure with the support garment secured to the torso form with a second amount of displacement of the one or more of the first breast structure and the second breast structure without the support garment secured to the torso form.

* * * * *